United States Patent [19]
Freeny, Jr.

[11] 3,924,065
[45] Dec. 2, 1975

[54] COHERENT, FIXED BAUD RATE FSK COMMUNICATION METHOD AND APPARATUS

[75] Inventor: Charles C. Freeny, Jr., Forth Worth, Tex.

[73] Assignee: Information Identification, Inc., Fort Worth, Tex.

[22] Filed: Apr. 5, 1974

[21] Appl. No.: 458,330

[52] U.S. Cl. .................................. 178/66 R; 325/30
[51] Int. Cl.$^2$ .................................. H04L 27/10
[58] Field of Search ........................ 178/66 R, 66 A; 179/15.55 R; 325/30, 163, 38 R, 38 A

[56] References Cited

UNITED STATES PATENTS

| | | | |
|---|---|---|---|
| 2,995,618 | 8/1961 | VanDauren et al. | 178/66 A |
| 3,325,595 | 6/1967 | Dascotte | 325/30 |
| 3,394,313 | 7/1968 | Ellis et al. | 325/30 X |

*Primary Examiner*—Benedict V. Safourek
*Attorney, Agent, or Firm*—Dunlap & Codding

[57] ABSTRACT

An improved FSK communication method and apparatus for communicating time division binary codes wherein the complement of each message bit is generated and transmitted following the generation and transmission of the message bit and wherein the transmitter and the receiver master clock signals are each derived from the FSK generator output signal, the transmission time for a message bit of "zero" being the same as the transmission time for a message bit of "one" thereby providing a frequency coherent FSK communication system having a fixed BAUD rate for message transmission independent of the number of "zeros" and "ones" comprising the communicated message code. A synchronization signal is automatically produced prior to the generation of the message bits and the message bit complements, and the messagae code is automatically repeated a predetermined number of times.

43 Claims, 6 Drawing Figures

COHERENT, FIXED BAUD RATE FSK COMMUNICATION METHOD AND APPARATUS

BACKGROUND OF THE INVENTION

1. Field of the Invention

The present invention relates generally to improvements in systems for communicating binary coded data and, more particularly, but not by way of limitation, to a method and apparatus providing a fixed BAUD rate, frequency coherent FSK communication system for communicating time division binary coded data.

2. Brief Description of the Prior Art

In the past, there have been various devices and systems proposed for communicating time division binary coded data between two objects utilizing various encoding and decoding techniques.

In some applications, the past systems have utilized an amplitude modulated carrier signal employing a timing clock in the transmitter and yet another timing clock in the receiver. In these systems, it was required that the transmitter and the receiver timing clocks be highly stable frequency generators designed to operate at substantially the same frequency or at least as close as practically and economically possible. This type of system is sometimes referred to as a non-coherent, synchronized system since the systems would not operate properly unless the receiver timing clock was operated within a predetermined frequency range of the transmitter timing clock. A communication system of this type was disclosed in the U.S. Pat. No. 3,270,338, issued to Watters, for example, other such systems being disclosed in the co-pending application entitled "Communication Apparatus for Communicating Between a First and a Second Object," Ser. No. 221,712, assigned to the assignee of the present invention.

Some other systems proposed in the past have utilized frequency shift key (FSK) binary encoding and decoding techniques for communicating time division binary coded data. In this type of system, a logical "zero" is transmitted at one frequency and a logical "one" is transmitted at another, distinct frequency. The encoding and decoding timing for most of the devices of this type were somewhat equivalent to the amplitude modulated coding technique in that separate transmitter and receiver timing clocks were required. A system of this type was disclosed in the U.S. Pat. No. 3,701,150, issued to Dame, wherein FSK signals were utilized to transmit binary coded data and the received FSK signal was then utilized to generate a DC voltage for controlling the operation of a receiver oscillator. In the patent issued to Dame, the receiver oscillator was utilized to transmit return binary coded data at a frequency closely related to a predetermined multiple of the master oscillator frequency located in the transmitter station, the coherency of the system depending on the stability of the DC voltage controlling the receiver oscillator.

One other system was disclosed in the application entitled "Communication Apparatus for Communicating Between a First and a Second Object," Ser. No. 221,712, assigned to the assignee of the present invention and referred to before. Generally, the particular system required a single oscillator in the interrogator station and the transponder station shifted the carrier frequency to a new return carrier frequency utilizing pulse counters to preserve the frequency coherency of the system and allow all timing and encoder/decoder shift register clock signals in the transponder station to be generated from the single master clock located in the interrogator station. In this manner the data received at the interrogator station was automatically synchronized to the transponder encoder independent of the master clock frequency. This system provided a frequency coherent system, but only certain types of coding could be synchronously transmitted between the interrogator station and the transmitter station without the addition of timing circuits and an oscillator in the transponder station.

One other past method was described in the U.S. Pat. No. 3,454,718, issued to Perreault, wherein the output signal of an FSK generator was utilized to clock a new message data bit every cycle of the FSK generator output signal, thereby providing a coherent relationship between the message data and the FSK generator output signal. However, this particular system produced a variable BAUD rate which was dependent on the transmitted message code.

Other methods and apparatus were disclosed in the United States Patents: No. 3,731,277, issued to Krutz et al.; No. 3,730,998, issued to Schmidt et al.; No. 3,737,901, issued to Scott; No. 3,718,899, issued to Rollins; No. 3,714,650, issued to Fuller et al.; No. 3,665,103, issued to Watkins; and No. 3,566,033, issued to Young. Each of these patents disclosed coherent synchronization methods and apparatus wherein the binary encoded message transmission rate was dependent on the particular message code being communicated. Other two frequency data transmission systems were disclosed in the United States Patents: No. 3,611,148, issued to Cox; No. 3,165,583, issued to Kretzmor; No. 3,102,238, issued to Bosen; and No. 3,302,114, issued to Denttertog.

DESCRIPTION OF THE PREFERRED EMBODIMENTS

Figure 1:
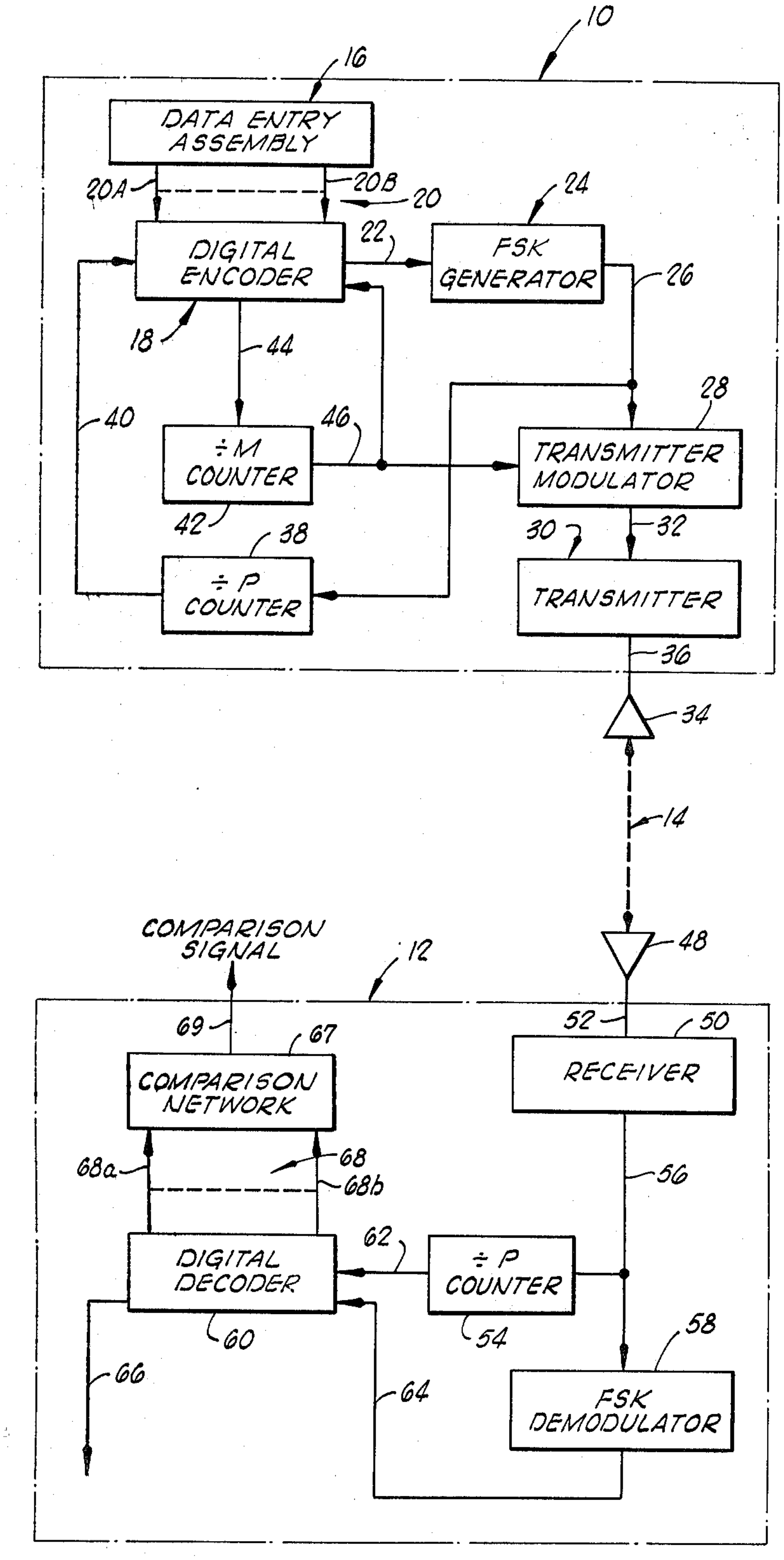
FIG. 1 is a schematic view of a transmitter station and a receiver station constructed in accordance with the present invention.
Figures 2, 3:
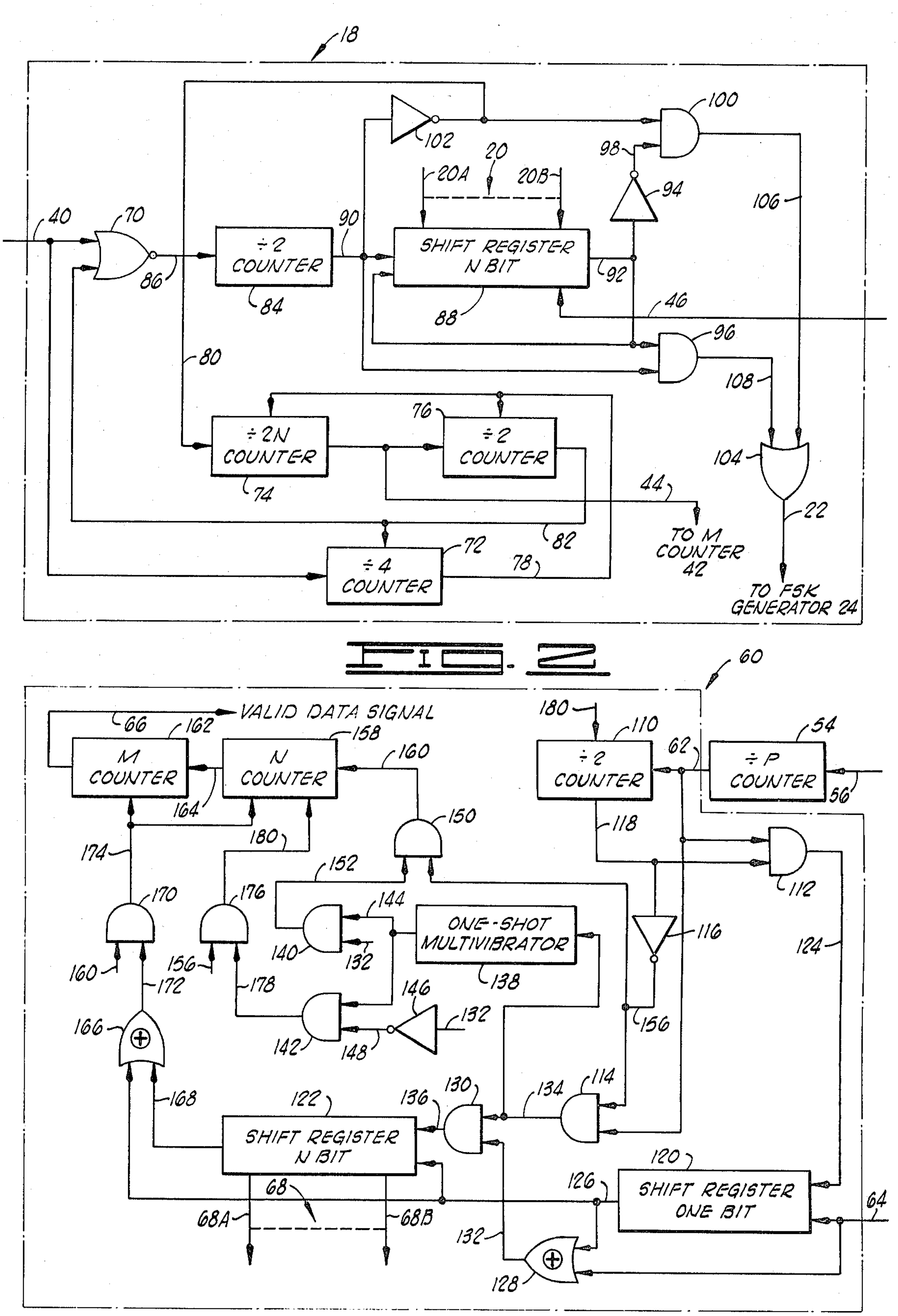
FIG. 2 is a schematic view showing the digital encoder of the transmitter station of FIG. 1.
FIG. 3 is a schematic view showing the digital decoder of the receiver station of FIG. 1.

In general, the method and apparatus of the present invention provide an improved system for communicating time division binary message codes between a transmitter station 10 and a receiver station 12 via a communication data link 14 utilizing frequency shift key (FSK) encoding and decoding techniques wherein a logical "zero" is transmitted at one frequency ($f_s$) and a logical "one" is transmitted at a second, distinct frequency ($f_m$), the transmitter station 10 and the receiver station 12 being shown in FIGS. 1, 2 and 3. The message code has a predetermined number (N) of logical "ones" and logical "zeros" arranged in a predetermined code format, each logical "one" and each logical "zero" in the transmitted message code being sometimes referred to herein simply as a "message bit". In a preferred form, a "synchronization bit" comprising a predetermined logical "one" or a logical "zero" is generated and transmitted prior to generation and transmission of the message code and, in a preferred form, the synchronization bit is generated and transmitted twice prior to the generation and transmission of the message code, the synchronization bit being identical to the first message bit in the (N) bit message code for reasons to be described in greater detail below.

The data link 14 is shown in the drawings as a "radio" type of data link; however, the data link connecting the transmitter station 10 and the receiver station 12 can be via available telephone lines or via direct wire connections. For example, the transmitter station 10 can be connected to a receiver station 12 via electrical conductors in such operational embodiments of the present invention as teletypewriters or other computers in which a common data base is utilized, and the transmitter station 10 and the receiver station 12 each include a binary coded address. It is to be specifically understood that the method and the apparatus are not to be limited to any particular type of data link except where a particular data link may be specifically identified in the claims.

The transmitter station 10 includes a data entry assembly 16 which is connected to a digital encoder 18 by a predetermined number (N) of parallel data entry signal paths 20, the first and the last or (Nth) data entry signal path being specifically shown in FIGS. 1 and 2 and designated therein via the reference numerals 20A and 20B for the purpose of clarity. In one preferred form, the data entry assembly is constructed to permit the predetermined message bits comprising the message code to be manually entered into the data entry assembly 16 in the predetermined code format (the sequency of "ones" and "zeros" comprising the message code) and connected to the digital encoder 18 via the data entry signal paths 20, the data entry assembly 16 comprising thumbwheel switches, push-buttons or other similar decimal-to-binary code converters well-known in the art.

The digital encoder 18 has an output signal having voltage levels (sometimes referred to herein as "logic levels") varying between two values, one value representing a logical "one" and one value representing a logical "zero," the digital encoder 18 output signal varying to provide an output signal corresponding to the synchronization bits and the message bits provided in a predetermined serial manner. More particularly, the digital encoder 18 is constructed to successively generate each message bit followed by the complement of the previously generated message bit (referred to sometimes herein as the message bit complement) for each message bit of the (N) bit message code, and to generate a synchronization signal (the synchronization bits or bit comprising the synchronization signal), the synchronization bits having the same logic level or value as the first message bit of the message code, in one preferred form. The synchronization bits are generated via the digital encoder 18 prior to the generation of the (N) bit message code. The synchronization bits and the message bits generated via the digital encoder 18 are connected via a signal path 22 to the control input of an FSK generator 24.

The FSK generator 24 has an "off" condition and an "activated" or "on" condition and is constructed to receive the digital encoder 18 output signal via the signal path 22 and to provide an output signal in the "on" condition thereof. The FSK generator 24, more particularly, generates an output signal having one of two distinct frequencies $(f_s)$ or $(f_m)$ in response to the received digital encoder 18 output signal, the FSK generator 24 being constructed to generate an output signal having a frequency $(f_s)$ in response to a received digital encoder 18 output signal having a voltage level representing a logical "zero" and to generate an output signal having a frequency $(f_m)$ in response to a received digital encoder 18 output signal having a voltage level representing a logical "one." In practice, the frequency values of the FSK generator 24 output signal $(f_s)$ and $(f_m)$ are typically selected such that the difference between the two frequencies $[(f_m)-(f_s)]$ is equal to an amount corresponding to the transmission bit rate multiplied by the numeral two (2), the transmission bit rate being sometimes referred to in the art and herein as the BAUD rate. In other words, it is typical in the art to construct the FSK generator such that: $[(f_m)-(f_s)] \cong$ (BAUD rate) (2).

The output signal of the FSK generator 24 is connected via a signal path 26 to a transmitter modulator 28 and the output signal of the transmitter modulator 28 is connected to a transmitter 30 via a signal path 32, the transmitter modulator 28 supplying the drive voltage for operating the transmitter 30. In response to the received transmitter modulator 28 output signal, the transmitter 30 provides an output signal which is connected to a transmitter antenna 34 via a signal path 36.

The transmitter 30, more particularly, is constructed to generate an output signal having a predetermined frequency which is selected considering the particular data link (the data link 14 being shown in FIG. 1) utilized for the transmission of data between the transmitter station 10 and the receiver station 12, the signal generated via the transmitter 30 being sometimes referred to herein as the "data link carrier signal," or simply as the "carrier signal," for the purpose of signal identification. The transmitter 30 receives the transmitter modulator 28 output signal via the signal path 32 and the data link carrier signal generated via the transmitter 30 is modulated via the frequency of the received transmitter modulator 28 output signal. As mentioned before, the FSK generator 24 output signal has a frequency of either $(f_s)$ or $(f_m)$, and the data link carrier signal is thus modulated by a frequency of either $(f_s)$ or $(f_m)$ depending upon the logic level of the data bit being transmitted, the modulated data link carrier signal being connected to the transmitter antenna 34 via the signal path 36.

The FSK generator 24 output signal is also connected to the input of a P-counter 38, the P-counter 38 being constructed to provide an output signal pulse in response to a received, predetermined number (P) input pulses of the signal connected thereto via the signal path 26. More particularly, the P-counter 38 provides an output signal pulse in response to each predetermined number (P) input pulses of the FSK generator 24 output signal, the output signal of the P-counter 38 changing states ("high" to "low" or "low" to "high") in response to each predetermined number (P) zero crossings of the input signal connected thereto and being sometimes referred to herein as a "zero crossing pulse generator." The output signal of the P-counter 38 is connected to the digital encoder 18 via a signal path 40 and provides the clock pulses for operating the digital encoder 18. Thus, the P-counter 38 output signal provides what is sometimes referred to herein as the "transmitter master clock signal" generating the required transmitter master clock pulses for operating the digital encoder 18, the transmitter master clock signal being derived from the FSK generator 24 output signal.

The transmitter master clock signal provided via signal path 40 is also connected to the input of an M-counter 42 via logic circuitry (to be described in greater detail below) located in the digital encoder 18, a signal path 44 connecting the digital encoder 18 and the input of the M-counter 42. The M-counter 42 is constructed to provide an output signal pulse in response to a received, predetermined number (M) input pulses connected thereto via the signal path 44, the M-counter 42 output signal being connected to the transmitter modulator 28 and to the digital encoder 18 via a signal path 46. The M-counter 42 output signal is, more particularly, connected to the digital encoder 18 for generating a load message strobe signal in the "high" state of the M-counter output signal automatically causing the message code on the data entry signal paths 20 to be transferred in parallel from the data entry assembly 16 to the digital encoder 18 after the message code and the complement of the message code have been repeatedly transmitted via the transmitter station 10 a predetermined number (M) of times.

The transmitter modulator 28 is operative in the "low" state of the M-counter 42 output signal modulating the data link carrier signal for transmission over the data link 14 and the transmitter modulator 28 is rendered inoperative in the "high" state of the M-counter 42 output signal. The M-counter 42 remains in the "high" state until a predetermined number (M) pulses are connected thereto via the signal path 44 and the transmitter station 10 does not transmit the message code nor provide a transmitter station 10 output signal via the transmitter antenna 34 during this period of time. This aspect of the transmitter station 10 is particularly useful when utilizing the transmitter station 10 and the receiver station 12 of the present invention in a two-way communication application since the period of time during which the transmitter station 10 does not provide an output signal allows incoming data to be received via a cooperating receiver station in a manner to be described below in conjunction with the description of FIG. 6. It should be particularly noted that this aspect of the invention is not necessary in all operational embodiments of the invention for communicating time division binary codes.

The transmitted message code and synchronization signal are connected to the receiver station 12 via the communication data link 14 and, more particularly, the transmitted message code and synchronization signal superimposed on the data link carrier signal are received via a receiver antenna 48, the received signal being connected to a receiver 50 via a signal path 52. The receiver 50 is constructed to receive the transmitted signal and to detect or separate the received FSK frequencies [($f_s$) and ($f_m$)] from the data link carrier signal, and the signal frequency of the receiver 50 output signal, having a frequency of ($f_s$) or ($f_m$), is connected to the input of a P-counter 54 via a signal path 56, the received FSK signal frequency on the signal path 56 also being connected to the input of an FSK demodulator 58.

The P-counter 54 is constructed to provide an output signal pulse in response to a predetermined number (P) received input pulses connected thereto via the signal path 56, the P-counter 54 output signal being connected to a digital decoder 60 via a signal path 62. The P-counter 54 output signal on the signal path 62 changes state (high to low or low to high) in response to each predetermined number (P) zero crossings of the input signal connected thereto and is sometimes referred to herein as a "zero crossing pulse counter" in a manner and for reasons described before with respect to the P-counter 38. The predetermined number (P) of the P-counter 54 located in the receiver station 12 is exactly the same as the predetermined number (P) of the P-counter 38 located in the transmitter station 10 and thus the signal on the receiver signal path 56 corresponds to the signal on the transmitter signal path 26 (i.e., the FSK generator 24 output signal). Thus, the output signal of the P-counter 54 divides the signal frequency on the signal path 56 by the predetermined number (P) and provides what is sometimes referred to herein as the "receiver master clock signal," the receiver master clock signal on the signal path 62 being utilized for clocking data into a digital shift register portion of the digital decoder 60 in a manner to be described in greater detail below.

The FSK demodulator 58 is constructed to receive the receiver 50 output signal via the signal path 56 and to demodulate the received FSK signals, the FSK demodulator 58 providing an output signal connected to the digital decoder 60 via the signal path 64. More particularly, the FSK demodulator 58 converts the received FSK signals into a binary coded data type of output signal and the binary coded data is connected to the digital decoder 60 via the signal path 64.

The binary coded data on the signal path 64 is received and decoded via the digital decoder 60 and the digital decoder 60 is constructed to count the number of times a predetermined, correct message code format has been received, the digital decoder 60 providing an output valid data signal via a signal path 66 in response to receiving a predetermined correct message code format a predetermined number of times. In other words, the valid data signal on the signal path 66 is provided via the digital decoder 60 in response to a received predetermined, correct code format which is repeatable a predetermined number of times thereby assuring that a correct, valid, predetermined code format derived from the incoming signal received at the receiver antenna 48 has been entered into the digital decoder 60.

Further, in one preferred embodiment, the receiver station includes a comparison network 67 for receiving the message code in the digital decoder 60 via parallel signal paths 68 (only the first and the last signal paths 68 being specifically shown in FIG. 1 and designated therein via the reference numerals 68A and 68B for the purpose of clarity). The comparison network 67 is constructed to compare the received message code connected thereto via the signal paths 68 with a predetermined, permanent receiver code (a permanently encoded message code uniquely identifying the receiver station 10) and to provide an output comparison signal 69 in response to an identical comparison between the received message code and the predetermined, permanent receiver message code, for reasons which will be made more apparent below.

Transmitter Station Digital Encoder

One preferred embodiment of the digital encoder 18 of the transmitter station 10 is shown in greater detail in FIG. 2. The transmitter master clock signal on the signal path 40 is connected to one of the inputs of a NOr NOR 70 and to the input of a counter 72, the counter 72 being constructed to provide an output signal pulse in the high state in response to two (2) input pulses connected thereto via the signal path 40, the counter 72 being shown in the drawings as a divide-by-four counter since the counter 72 output signal changes state in response to four changes in state of the input signal (four changes in state of the input signal corresponding to two pulses). In other words, the counter 72 provides an output signal pulse in response to two received input pulses of the transmitter master clock signal on the signal path 40, for reasons to be described in greater detail below.

The counter 72 output signal is connected to the reset input of a divide-by-(2N) counter 74 and to the reset input of a counter 76 via a signal path 78, the counter 72 providing a reset signal for resetting the counters 74 and 76. The counters 74 and 76 are constructed such that each counter 74 and 76 is in the "operative" condition counting the input signal pulses in the low state of the reset signal on the signal path 78, and each counter 74 and 76 is in the "non-operative" or "off" condition in the high state of the reset signal on the signal path 78.

The counter 74 is constructed to provide an output signal pulse in response to each predetermined number (N) input pulsed connected to the input thereof via a signal path 80, i.e. in response to (2N) changes in the state of the input signal connected thereto as indicated in FIG. 2 via the designation (2N). The counter 74 output signal is connected to the input of the M-counter 42 via the signal path 44 and is connected to the input of the counter 76. The counter 76 is constructed to provide an output signal pulse in response to a received predetermined number [one (1)] pulses connected to the input thereof via the signal path 44, i.e. in response to two changes in the state of the input signal connected thereto. The output signal of the counter 76 is connected to the input of the NOR gate 70 and to the reset input of the counter 72 via a signal path 82, the counter 72 being in the "operative" condition in the low state of the signal on the signal path 82 and being in the non-operative or "off" condition in response to a high signal on the signal path 82.

The NOR gate 70 thus receives signals connected to the inputs thereof via the signal paths 40 and 82 and is constructed to provide an output signal corresponding to the transmitter master clock signal received via the signal path 40 when the signal on the signal path 82 is in the low state. Thus, in the low state of the signal on the signal path 82, the transmitter master clock pulse is connected to the input of a counter 84 via the NOR gate 70 and a signal path 86 connects the output of the NOR gate 70 to the input of the counter 84. The counter 84 is constructed to provide an output signal pulse in response to a received predetermined number of input pulsed connected thereto via the signal path 86 and, more particularly, in response to one received input pulse connected to the input thereof via the signal path 86, i.e. the counter 84 output signal on the signal path 90 changes state in response to two changes in the state of the input signal connected thereto (the counter 84 being commonly referred to as a divide-by-two counter). The counter 84 output signal provides a clock signal for operating a shift register 88, the counter 84 output signal being connected to the shift register 88 via a signal path 90 and sometimes referred to herein as the "shift register clock signal." The counter 84 output signal also provides a signal for operating certain encoder 18 control gates in a manner to be described in greater detail below.

More particularly, the shift register 88 is an N-bit message storage unit such as an N-bit parallel in/serial out type of shift register since the binary coded data (the message code) is entered into the shift register 88 via the parallel data entry paths 20 and clocked from the shift register 88 in a serial manner via a signal path 92 in response to the shift register clock signal pulses received on signal path 90. The shift register 88 output signal is connected to the shift register 88 input, connected to the input of an inverter 94 and connected to the input of an AND gate 96 via the signal path 92. Since the shift register 88 output signal is connected to the shift register 88 input, the binary coded data clocked from the shift register 88 in a serial manner is also clocked back into the shift register 88 via the signal path 92 and the shift register clock signal on the signal path 90. In this manner, the binary coded data (the message code) is cyclically clocked from the N-bit shift register 88 in a serial manner during one aspect of the operation of the transmittter station 10.

The inverter 94 provides an output signal via the signal path 98 which is in the high state in response to a received signal in the low state on the signal path 92 and provides an output signal in the low state in response to a received signal in the high state on the signal path 92, the inverter 94 output signal being connected via a signal path 98 to the input of an AND gate 100. The counter 84 output signal or, in other words, the shift register clock signal on the signal path 90 is connected to the input of the AND gate 96 and is also connected to an inverter 102. The inverter 102 provides an output signal in the high state in response to a received signal in the low state on the signal path 90 and provides an output signal in the low state in response to a received input signal in the high state on the signal path 90, the inverter 102 output signal being connected to the input of the AND gate 100 and to the input of the counter 74 via the signal path 80.

The output signal of the AND gate 100 is connected to the input of an OR gate 104 via a signal path 106. The output signal of the AND gate 96 is connected to the input of the OR gate 104 via a signal path 108.

During the operation of the transmitter station 10, the (N) message bits are entered into the data entry assembly 16 in the predetermined sequence or code format comprising the message code, the message bits being connected to the N-bit shift register 88 via the data entry signal paths 20. The signal on each of the data entry signal paths 20 has either a logical low level or a logical high level corresponding to the logic value of the particular message bit.

The FSK generator 24 is then activated or positioned in the "on" condition generating an output signal which is connected to the transmitter modulator 28 and the P-counter 38 (zero crossing pulse generator). Thus, the output signal of the P-counter 38 has a frequency of (1/P) times the frequency of the FSK generator 24 output signal or, in other words, the P-counter 38 output signal provides a series of pulses occurring at a rate of (1/P) times the rate of the FSK generator 24 output signal, the P-counter 38 output signal providing the transmitter master clock signal which is derived from and coherently related to the FSK generator 24 output signal frequency by a factor of (1/P).

The transmitter master clock signal is connected to the counter 84 via the NOR gate 70 when the signal on the signal path 82 is in the low state, the signal on the signal path 82 being switched to the high state after the predetermined number (N) pulses representing the message bits and the predetermined number (N) message bit complements have been generated and transmitted by the transmitter 10. When the counter 74 is incremented (2N) times in response to (N) received input pulses, (N) message bits and (N) message bit complements have been connected to the digital encoder 18 output signal path 22 since the message bits are connected to the digital encoder 18 output signal path 22 when the shift register clock signal is high and the message bit complements are connected to the digital encoder 18 output signal when the shift register clock signal is low, in a manner to be made more apparent below.

Figure 4:
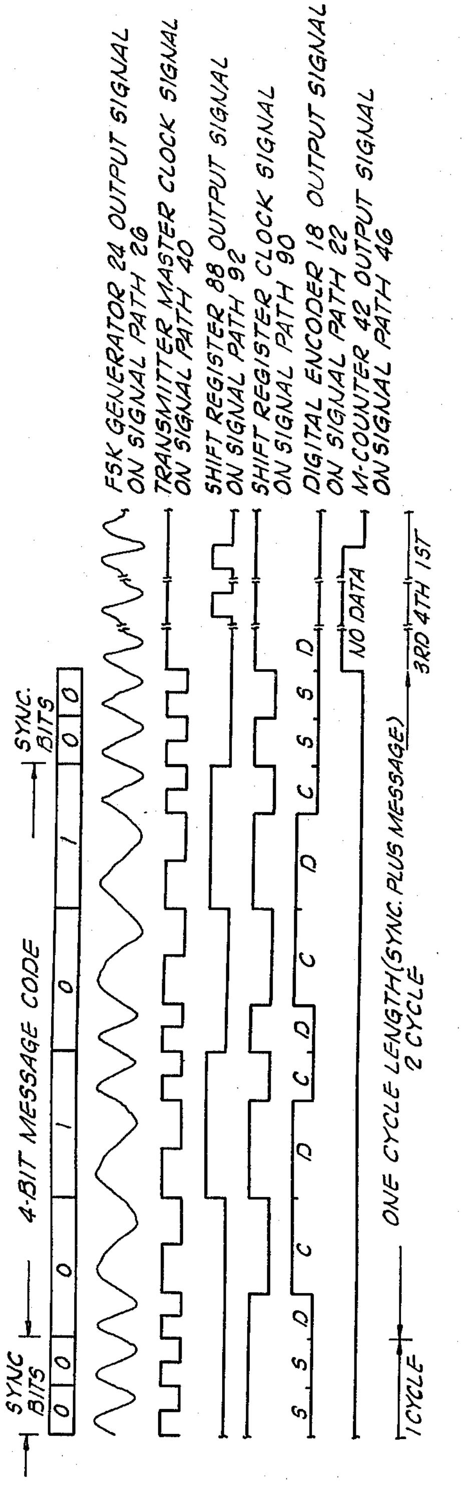
FIG. 4 is a diagrammatic view showing an example message code and some of the corresponding signals generated in the transmitter station for the particular example message code.
Figure 5:
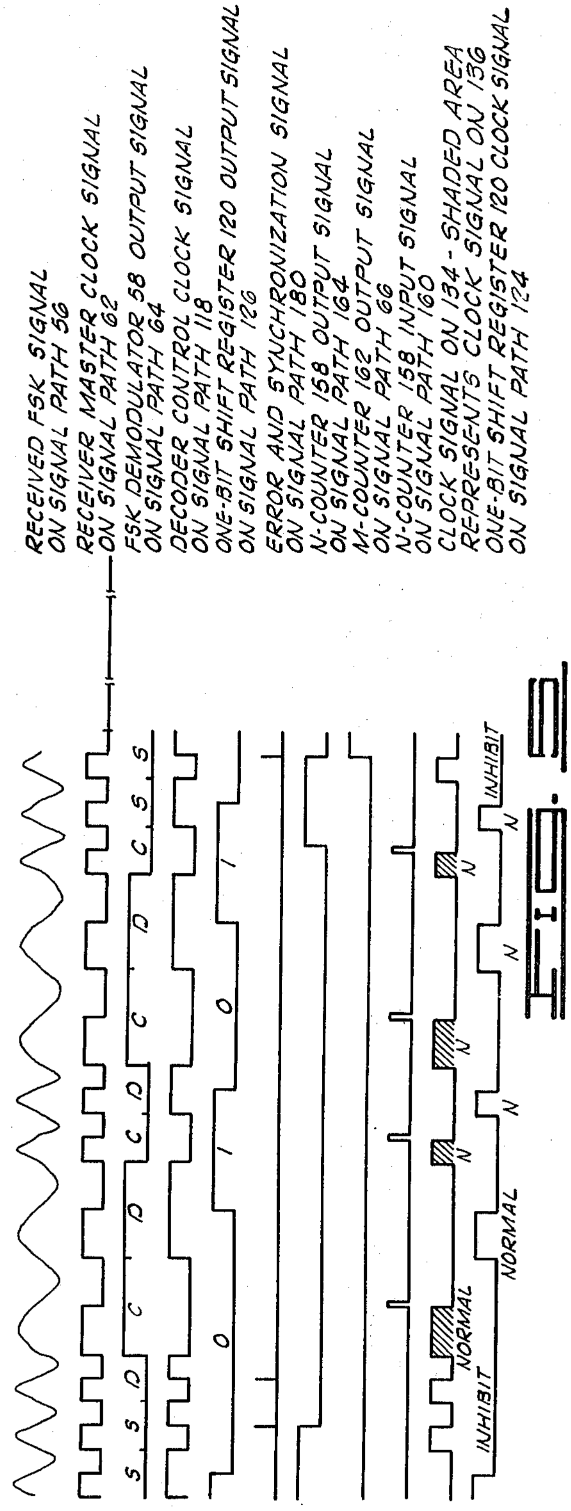
FIG. 5 is a diagrammatic view, similar to FIG. 4, but showing some of the signals generated in the receiver station assuming the example transmitted message code diagrammatically shown in FIG. 4.

The counter 76 output signal on the signal path 82 is changed to the high state in response to the message bit-message bit complement sequence generation just described being repeated a predetermined number of times, more particularly, twice with respect to the divide-by-two counter 76 shown in FIG. 2. The divide value of the counter 76 can be changed to provide a message bit-message bit complement sequence generation repeatable a number of times greater than two if desired in a particular operational embodiment of the invention, the particular divide value of the counter 74 being selected in each instance to cooperate with the predetermined value of (M) of the M-counter 42 [the value of (M) being assumed to be two for the purpose of determining the divide value of the counter 76 as shown in FIG. 2, and for the purpose of illustrating the various signals generated in the transmitter station 10 and the receiver station 12 during the operation, as shown in FIGS. 4 and 5, to be referred to in greater detail below].

The output signal of the counter 84 provides a series of pulses occurring at a rate of (1/2P) times the rate of the FSK generator 24 output signal or, in other words, one-half the rate of the transmitter master clock signal on the signal path 40. The counter 84 output signal is connected to the N-bit shift register 88 and provides the shift register clock signal for clocking data into and from the N-bit shift register 88. The shift register clock signal on the signal path 90 thus operates at a rate or, in other words, has a frequency of (1/2P) times the frequency of the FSK generator 24 output signal independent of the frequency of the FSK generator 24 output signal, i.e. the shift register clock signal has a frequency (1/2P) times the frequency of the FSK generator 24 output signal even if the frequency of the FSK generator 24 output signal is changed. The operation of the transmitter station 10 is thus completely self-synchronizing without the necessity of providing a stable master clock and regardless of the frequency of the FSK generator 24 output signal.

The message bits are clocked from the N-bit shift register 88 in a serial manner at a rate determined by the shift register clock signal on the signal path 90 and the message bits clocked from the N-bit shift register 88 are also clocked back into the N-bit shift register 88 in a serial manner via the signal path 92 connected to the N-bit shift register 88 input. The message bits clocked from the N-bit shift register are connected to the AND gate 96 and the shift register clock signal on the signal path 90 is also connected to the AND gate 96. Thus, the shift register clock signal on the signal path 90 and the message bit on the signal path 92 are each simultaneously connected to the AND gate 96 causing the message bit to be connected to the OR gate 104 via the AND gate 96 output signal on the signal path 108.

The shift register clock signal on the signal path 90 is connected to the AND gate 100 via the inverter 102 and the N-bit shift register output signal is connected to the AND gate 100 via the inverter 94. Thus, when a high message bit is clocked from the N-bit shift register 88 and a shift register clock pulse appears on the signal path 90 (the transmitter N-bit shift register 88), the two input signals connected to the AND gate 100 are each produced in the low state via the inverters 102 and 94. In this condition, a low output signal is produced from the AND gate 100 and the AND gate 96 output signal on the signal path 108 controls the OR gate 104 output signal on the signal path 22 or, in other words, the digital encoder 18 output signal, and the signal on the signal path 22 represents one of the message bits clocked from the N-bit shift register 88).

When the shift register clock signal on the signal path 90 is in the low state, the inverter 102 output signal on the signal path 80 is in the high state. Since the shift register clock signal on the signal path 90 is in the low state, the OR gate 104 output signal on the signal path 22 is controlled by the AND gate 100 output signal on the signal path 106 and thus the OR gate 104 output signal on the signal path 22 corresponds to or represents the message bit complement.

The shift register clock signal on the signal path 90 and the control gates 96 and 100 cooperate with the gate 104 to produce each message bit of the N-bit message code followed by the message bit complement. The generation of the message bit-message bit complement sequence is described below in tabular form for the purpose of clarity assuming first a message bit having a logic level of "one" and second a message bit having a logic level of "zero."

1. When the shift register clock signal on the signal path 90 is in the high state, the message bit having a logic level of "one" is clocked from the shift register 88, the signal on the signal path 92 being in the high state in this condition.
2. The input signals to the control gate 96 on the signal paths 90 and 92 are thus each in the high state and the control gate 96 output signal on the signal path 108 is in the high state.
3. Since the signal on the signal path 92 is in the high state, the inverter 94 output signal on the signal path 98 is in the low state. Since the signal on the signal path 90 is in the high state, the inverter 102 output signal on the signal path 80 is in the low state. Thus, the input signals to the control gate 100 on the signal paths 80 and 98 are each in the low state, and the control gate 100 output signal on the signal path 106 is in the high state.
4. Since the input signal on the signal path 108 is in the high state and the input signal on the signal path 106 is in the high state, the OR gate 104 output signal on the signal path 22 is in the high state corresponding to the logic level of the message bit clocked from the shift register 88.

5. When the shift register clock signal on the signal path 90 subsequently changes to the low state, a message bit is not clocked from the shift register 88 and the shift register 88 output signal on the signal path 92 remains in the high state corresponding to the logic level of the message bit previously clocked from the shift register 88.
6. since the signal on the signal path 90 is in the low state and the signal on the signal path 92 is in the "high" state, the control gate 96 output signal on the signal path 108 is in the low state.
7. Since the signal on the signal path 90 is in the low state, the inverter 102 output signal on the signal path 80 is in the high state. Since the signal on the signal path 92 is in the "high" state, the inverter 94 output signal on the signal path 98 is in the low state. Thus, one of the input signals to the control gate 100 on the signal path 80 is in the high state and the other input signal on the signal path 98 is in the low state, the control gate 100 output signal on the signal path 106 being in the low state in this condition.
8. Since the signal path 108 is in the low state and the signal on the signal path 106 is in the low state, the OR gate 104 output signal on the signal path 22 is in the low state, a logic level representing or corresponding to the complement of the message bit previously clocked from the shift register 88. Thus, the message bit complement is on the signal path 22 in this condition, the message bit appearing on the signal path 22 in the high state of the shift register clock signal and the message bit complement appearing on the signal path 22 in the low state of the shift register clock signal.
9. When the shift register clock signal on the signal path 90 changes to the high state another message bit is clocked from the shift register 88 and, assuming the next message bit has a logic level corresponding to a logical "zero," the signal on the signal path 92 is in the low state.
10. Since the input signal on the signal path 90 is in the high state and the signal on the signal path 92 is in the low state, the control gate 96 output signal on the signal path 108 is in the low state.
11. Since the signal on the signal path 90 is in the high state, the inverter 102 output signal on the signal path 80 is in the low state and, since the signal on the signal path 92 is in the low state, the inverter 94 output signal on the signal path 98 is in the high state. Thus, one of the input signals to the control gate 100 is in the low state on the signal path 80 and the other input signal on the signal path 98 is in the high state, the control gate 100 output signal on the signal path 106 being in the low state in this condition.
12. Since the signal on the signal path 108 is in the low state and the signal on the signal path 106 is in the low state, the OR gate 104 output signal on the signal path 22 is in the low state, a logic level representing the message bit clocked from the shift register 88.
13. When the shift register clock signal subsequently changes to the low state, a message bit is not clocked from the shift register 88 and the shift register 88 output signal on the signal path 92 remains in the low state corresponding to the logic level of the message bit previously clocked from the shift register 88.
14. Since the signal on the signal path 92 is in the low state and the signal on the signal path 90 is in the low state, the control gate 96 output signal on the signal path 108 is in the high state.
15. Since the signal on the signal path 90 is in the low state, the inverter 102 output signal on the signal path 80 is in the high state. Since the signal on the signal path 92 is in the low state, the inverter 94 output signal on the signal path 98 is in the high state. Thus, the two input signals to the control gate 100 are each in a high state and the control gate 100 output signal on the signal path 106 is in the high state.
16. Since the signal on the signal path 106 is in the high state and the signal on the signal path 108 is in the high state, the OR gate 104 output signal on the signal path 22 is in the high state, a logic level corresponding to the complement of the message bit previously clocked from the shift register 88.

The signal on signal path 82 is normally in the low state. The inverter 102 output signal is connected to the input of the counter 74 via the signal path 80 and thus, after (N) shift register clock pulses are produced on the signal path 80, the counter 74 output signal is changed to the high state or, in other words, produces an output pulse on the signal path 44 connected to the counter 76 input. The counter 76 is changed to the high state or, in other words, produces an output pulse on the signal path 82 in response to one (1) input pulse [two changes in the state of the input signal] connected thereto from the counter 74 via the signal path 44 or, in other words, after (N) shift register clock pulses [(2N) changes of state of the shift register clock signal] are produced on the signal path 80.

The counter 76 output signal is connected to the reset input of the counter 72 and, when the counter 76 produces a high output signal pulse, the counter 72 is allowed to count the transmitter master clock pulses connected thereto via the signal path 40, the counter 72 being in the "activated" or "on" condition in the high state of the signal on the signal path 82. Further, when the counter 76 produces an output signal pulse, the signal on the signal path 82 is in the high state and the output signal of the NOR gate 70 to the counter 84 is in the low state regardless of the transmitter master clock signal on the signal path 40. After two transmitter master clock pulses [corresponding in time to two shift register clock signal pulses] have been produced on the signal path 40 connected to the counter 72, the counter 72 output signal is returned to the high state resetting the counters 74 and 76 and returning the counter 76 output signal to the low state, thereby resetting or deactivating the counter 72.

After (N) message bits and (N) message bit complements have been generated, the counter 72 output signal is in the high state causing the first message bit to be connected to the FSK generator 24 via the signal path 22 for the next two cycles of the transmitter master clock signal. In this condition, the first message bit is on the signal path 92 and the first message bit remains on the signal path 92 for two cycles of the transmitter master clock signal thereby producing the two synchronization bits identical to the first message bit prior to the subsequent generation and transmission of the message bits and the message bit complements in a serial manner as described before. The number of synchronization bits which will be produced preceding the first message bit will be two less than the divider value of the counter 72. If the divider value of the counter 72 is four, as shown in FIG. 2, there will be two synchronization bits produced having a total time duration corresponding to the time duration of two transmitter master clock pulses: the first two transmitter master clock pulses applied on signal path 40 are counted by the counter 72 allowing the two synchronization bits to be produced; the third transmitter master clock pulse on signal path 40 is counted by the counter 72 allowing the first message bit to be produced; and the fourth transmitter master clock pulse on signal path 40 is counted by the counter 72 thereby causing the output signal on the signal path 78 to change from the low state to the high state with the above described result of allowing the transmitter master clock pulse to pass through the NOR gate 70 and initiate the generation of the first message bit. Thus, the logic level of the synchronization bits is identical to the logic level of the first message bit of the message code in the N-bit shift register 88, and the number of the synchronization bits is determined by the counter 72.

The counter 74 output signal is connected to the input of the M-counter 42 via the signal path 44, the M-counter 42 output signal controlling the operation of the transmitter modulator 28 and providing the load message strobe signal causing the N-bit shift register 88 to be loaded with the N-bit message code. After the transmission of the (N) message bits and the (N) message bit complements has been repeated cyclically a predetermined number (M) times, the M-counter 42 output signal will change to the high state and will remain in the high state for the predetermined number (M) cycles [the signal on the signal path 44 changes from a high state to a low state (M) times]. In this manner, the transmitter demodulator 28 is rendered inoperative for a predetermined period of time by the (M) value of the M-counter 42.

During the predetermined number of (M) cycles when the load message strobe signal on the signal path 46 is in the high state, the (N) message bits entered into the data entry assembly 16 are transferred or loaded into the N-bit shift register 88 via the data entry signal paths 20 and the transmitter modulator 28 is rendered inoperative. After the predetermined number (M) pulses are applied to the M-counter 42 via the signal path 44, the M-counter 42 output signal on the signal path 46 is changed to the low state allowing the N-bit shift register 88 to operate in a serial manner and the transmitter modulator 28 to operate the transmitter 30 in a manner allowing the transmission of the binary coded data in a manner described before.

Thus, the digital encoder 18 operates to first connect each message bit followed by the message bit complement in a serial manner to the input of the FSK generator 24, the synchronization bits being connected to the FSK generator 24 immediately following the transmission of the (N) message bits and the (N) message bit complements. The FSK generator 24 produces a signal on a signal path 26 having a frequency ($f_s$) when the signal level on the signal path 22 from the digital encoder 18 represents a logical "zero" and to produce an output signal on a signal path 26 having a frequency ($f_m$) when the digital encoder 18 output signal on the signal path 22 has a signal level representing or corresponding to a logical "one". The digital encoder 18 output signal on the signal path 22 representing one of the message bits stored in the N-bit shift register 88 generated via the digital encoder 18 remains on the signal path 22 for (1/2P) cycles of the FSK generator 24 output signal on the signal path 26 and the message bit complement on the signal path 22 also remains on the signal path 22 for (1/2P) cycles of the FSK generator 24 output signal on the signal path 26. The time required to transmit a message bit is $$\left(\frac{1}{f_s} + \frac{1}{f_m}\right)$$

when the logic value of the message bit corresponds to a logical "zero" or $$\left(\frac{1}{f_m} + \frac{1}{f_s}\right)$$

when the message bit corresponds to a logical "one." Thus, the time required to transmit either a message bit and its message bit complement having a logical value of "one" is the same as the time required to transmit a message bit and its message bit complement having a logical value of "zero," thereby allowing the digital encoder 18 to be coherently related to the FSK generator 24 and yet transmit a message code at a fixed BAUD rate. The present invention thus provides an FSK communication system capable of transmitting the message code at a fixed BAUD rate and simultaneously provides a frequency coherent FSK communication system, the present invention also providing an FSK communication system wherein errors in the received signals are detected in a more efficient manner as will be described below. The fixed BAUD rate of the present invention refers particularly to the aspect of the present invention wherein the time to transmit a message bit of "zero" is the same as the time required to transmit a message bit of "one" and the transmission time is not dependent and does not vary depending upon the particular transmitted message code (the number of message bits having a logic value of logical "one" and the number of message bits having a logic value of logical "zero" in the message code) nor the selected frequencies of the FSK generator output signal ($f_s$) and ($f_m$).

In summary, the counter 84, the inverter 102, the AND gate 100, the inverter 94, the AND gate 96, and the OR gate 104 operate and control the N-bit shift register 88 so the digital encoder 18 generates the message bit followed by its message bit complement for each of the (N) message bits in a serial manner, these elements being sometimes collectively referred to herein as the logic network for generating the message bit followed by the message bit complement for each of the (N) message bits. The output signal produced on the signal path 44, the M-counter 42, the M-counter 42 output signal on the signal path 46 and the N-counter 74 are sometimes referred to herein collectively as the "means" for generating the load message strobe signal for loading a new message code into the N-bit shift register 88 after the generation and transmission of the messsage bits each followed by its message bit complement the predetermined number (M) times. The NOR gate 70, the N-counter 74, the counter 76 and the counter 72 are sometimes referred to herein collectively as the "means" for generating a synchronization bit or synchronization signal after the generation and transmission of every (N) message bits each followed by its message bit complement.

It should be noted that the counter 84 could be changed to a counter having a divider value other than two as shown in FIG. 2. In this manner, more than one logic level can be produced following the generation of each message bit or, in other words, more than two signals are produced on the signal path 22 for each message bit of the N-bit message code. In an operational embodiment of this type an additional logic network would also be added similar to the logic network including the control gates 96 and 100 described in detail before. For example, if the counter 84 was changed to a divide-by-four counter, three signals would be produced on the signal path 22 for each message bit of the N-bit message code. This type of operational embodiment may enhance the error detection ability even further which may be desirable in some applications.

To further illustrate the operation of the transmitter station 10, a 4-bit binary message code comprising the message bits of: (0) — (1) — (0) — (1), is shown in FIG. 4, together with the synchronization bits (the synchronization bits designated in FIG. 4 as "SYNC. BITS"), the synchronization bits having a logic value identical to the logic value of the first message bit (zero). Thus, the value of (N) is four since there are 4 message bits in the message code. The FSK generator 24 output signal, the transmitter master clock signal, the shift register 88 output signal, the shift register clock signal, the digital encoder 18 output signal and the M-counter 42 output signal are each illustrated in FIG. 4 for the message code shown in FIG. 4, a designated value of one for the predetermined number (P), [P = 1] and a designated value of two for the predetermined number (M), [M = 2] being selected for determining the signals of FIG. 4.

Since the value of (P) is (1), the P-counter 42 produces an output transmitter master clock pulse on the signal path 40 for each one cycle of the received FSK generator 24 output signal on the signal path 26. The shift register clock signal on the signal path 90 produces clock pulses at one-half the rate that clock pulses are produced on the signal path 40 (the transmitter master clock signal).

When the signal on the signal path 82 is low, the transmitter master clock signal is connected to the counter 84 and the shift register clock signal is connected to the shift register 88 via the signal path 90. Since the shift register clock signal produces pulses at one-half the rate of the transmitter master clock signal, a message bit, when clocked from the shift register 88, has a duration exactly equal to one cycle of the FSK generator 24 output signal on the signal path 26, and the message bit complement also has a duration exactly equal to one cycle of the FSK generator 24 output signal on the signal path 26. Further, the number of the synchronization bits (the duration) is determined via the counter 72 and, in the embodiment of the invention shown in FIG. 2, the counter 72 being a divide-by-four counter, the total time duration of the synchronization bits is exactly the time required for two transmitter master clock pulses on the signal path 40.

In FIG. 4, the symbol (S) represents a synchronization bit, the symbol (D) represents the logic state of a message bit and the symbol (C) represents a logic complement of a message bit. As shown in FIG. 4, when the shift register clock signal on the signal path 90 is in the high state, the digital encoder 18 output signal on the signal path 22 represents a message bit clocked from the shift register 88 and, when the shift register clock signal on the signal path 90 is in the low state, the digital encoder 18 output signal path 22 represents the message bit complement.

When the M-counter 42 output signal is changed to the low state, the transmitter station 10 is inoperative or, in other words, binary coded data is not generated and transmitted for a predetermined period of time determined via the M-counter 42, as described before and as illustrated in FIG. 4. The signal transmitted via the transmitter 30 includes the message bits, the message bit complements and the synchronization bits, the transmitted binary coded data being referred to sometimes herein as "transmitted logic levels."

Receiver Station Digital Decoder

One preferred embodiment of the digital decoder 60 is shown in greater detail in FIG. 3. The P-counter 54 output signal (the receiver master clock signal), is connected to the input of a divide-by-two counter 110 via the signal path 62, the signal path 62 also being connected to the input of an AND gate 112 and to the input of an AND gate 114. The counter 110 is constructed to provide an output pulse in response to each two received input pulses connected thereto via the signal path 62, the counter 110 output signal being connected to an inverter 116 and to the AND gate 112 via a signal path 118. As previously mentioned, the transmitter station 10 generates and transmits a message bit complement immediately following the generation and transmission of each message bit and thus every other or every second data bit or logic level received via the receiver station 12 represencts the complement of the preceding message bit. The counter 110 output signal applied to the signal path 118 functions as a decoder control clock signal allowing only every other received data bit (received logic level) to be clocked into a one-bit shift register 120 and then to an N-bit shift register 122, thereby assuring that only the message bits and not the message bit complements are clocked into the shift registers 120 and 122 during the operation of the digital decoder 60.

The signal on the signal path 56 is the received FSK signal and corresponds to the FSK generator 24 output signal on the signal path 26. The P-counter 54 is thus operated by the same FSK signal as the P-counter 38, and the receiver master clock signal on the signal path 62 produces clock pulses at a rate (1/P) times the frequency rate of the received FSK signal connected to the P-counter 54 via the signal path 56, the receiver master clock signal and the transmitter master clock signal each producing clock pulses at an identical rate related to the FSK generator 24 output signal. Therefore, the receiver master clock signal and the transmitter master clock signal are frequency coherent since both are similarly derived from the FSK generator 24 output signal.

The decoder control clock signal on the signal path 118 produces clock pulses at a rate (1/2P) times the frequency rate of the FSK signal on the signal path 56 or, in other words, the decoder control clock signal produces clock pulses at one-half the rate clock pulses are produced via the receiver master clock signal. The decoder control clock signal of the receiver station 12 and the shift register clock signal on the signal path 90 of the transmitter station 10 are thus frequency coherent since both produce clock pulses at a rate of (1/2P) times the frequency rate of the FSK generator 24 output signal, both signals being frequency coherent with the FSK generator 24 output signal.

The AND gate 112 output signal is connected to the input of the one-bit shift register 120 and provides the one-bit shift register clock signal for clocking data into the one-bit shift register 120 when connected thereto via the signal path 124 connected between the AND gate 112 and the shift register 120. The output signal of the one-bit shift register 120 is connected to the input of the N-bit shift register 122 via a signal path 126, the signal path 126 also being connected to the input of an exclusive OR gate 128. The other input of the exclusive OR gate 128 is connected to the FSK demodulator 58 output signal on the signal path 64, and the output signal of the exclusive OR gate 128 is connected to the input of an AND gate 130 via a signal path 132. The output signal of the AND gate 114 is connected to the other input of the AND gate 130 via a signal path 134 and the output signal of the AND gate 130 is connected to the N-bit shift register 122 via a signal path 136 providing the N-bit shift register clock signal for clocking data received on the signal path 126 into the N-bit shift register 122. The one-bit shift register clock signal on the signal path 124 and the N-bit shift register clock signal on the signal path 136 are each derived from the decoder control clock signal 118 and both are frequency coherent and coherently related to the FSK generator 24 output signal of the transmitter station 10 received via the receiver station 12.

The AND gate 114 output signal is also connected to the input of a one-shot multivibrator 138 via the signal path 134, the output signal of the one-shot multivibrator 138 being connected to the input of an AND gate 140 and to the input of an AND gate 142 via a signal path 144. The exclusive OR gate 128 output signal is also connected to one of the inputs of the AND gate 140, and is connected to one of the inputs of the AND gate 142 via the signal path 132. The exclusive OR gate 128 output signal is connected to one of the inputs of the AND gate 142 via the signal path 132 and an inverter 146, the inverter 146 output signal being more particularly connected to one of the inputs of the AND gate 142 via a signal path 148. The AND gate 140 output signal is connected to one of the inputs of an AND gate 150 via a signal path 152 and the other input of the AND gate 150 is connected to receive the inverter 116 output signal via a signal path 156, the inverter 116 output signal also being connected to one of the inputs of the AND gate 114 via the signal path 156.

The AND gate 150 output signal is connected to an N-counter 158 via a signal path 160, the N-counter providing an output signal for each predetermined number (N) input signal pulses connected thereto via the signal path 160. The N-counter 158 output signal is connected to the input of an M-counter 162 via a signal path 164, the M-counter 162 being constructed to provide an output signal in response to each predetermined number (M) input pulses connected thereto via the signal path 164. The M-counter output signal 162 provides the valid data signal via the signal path 66, in a manner to be described in greater detail below.

The N-bit shift register 122 output signal is connected to one of the inputs of an exclusive OR gate 166 via a signal path 168 and the other input of the exclusive OR gate 166 is connected to the one-bit shift register output signal on the signal path 126. The exclusive OR gate 166 output signal is connected to one of the inputs of an AND gate 170 via a signal path 172 and the other input of the AND gate 170 is connected to the signal path 160 for receiving the AND gate 150 output signal. The AND gate 170 output signal is connected to the reset input of the M-counter 162 and to the reset input of the N-counter 158 via a signal path 174, the AND gate 170 output signal providing a reset signal for resetting the M-counter 162 and the N-counter 158, for reasons and in a manner to be described in greater detail below.

The AND gate 142 output signal is connected to one of the inputs of an AND gate 176 via a signal path 178 and the other input of the AND gate 176 is connected to the signal path 156 for receiving the inverter 116 output signal. The AND gate 176 output signal is connected to the reset input of the N-counter 158 via a signal path 180, the signal path 180 also being connected to the reset input of the divide-by-two counter 110. The AND gate 176 output signal thus provides a reset signal for resetting the N-counter 158, the divide-by-two counter 110 and the P-counter 54 for reasons and in a manner to be described in greater detail below.

The N-bit shift register 122 is constructed to receive binary coded data in a serial manner, the binary coded data on the signal path 126 being clocked into the N-bit shift register 122 via the N-bit shift register clock signal on the signal path 136. The binary coded data in the N-bit shift register 122 is provided via the predetermined number (N) parallel connected output signal paths 68. Thus, each message bit entered into the N-bit shift register 122 in a serial manner is represented via the voltage level on one of the parallel signal paths 68 and the N-bit shift register 122 is more particularly of the type generally referred to in the art as a serial in/-parallel out type of digital shift register [only the first and the last or (Nth) signal path being specifically shown in FIG. 3 and designated therein via the reference numerals 68A and 68B for the purpose of clarity]. In one form, the signal paths 68 are each connected to the comparison network 67 which is constructed to receive the binary coded message code and compare the message code from the N-bit shift register 122 with a predetermined, receiver message code, the comparison network 67 generating the comparison signal on a signal path 69 when the compared message codes are identical.

As generally described before, the receiver station 12 is constructed to check the received, transmitted message code and count the number of times the correct transmitted message code has been received, the receiver station 12 being particularly constructed to determine that the transmitted message code has been received a predetermined number (M) times prior to the generation of the valid data signal on a signal path 66. Further, the receiver station 12 of the present invention provides frequency coherent FSK communication type of apparatus and thus requires no oscillators to generate a receiver master clock signal for operating the digital decoder 60. The incoming, received FSK signal is utilized by the receiver station 12 to provide the receiver master clock signal since this signal oscillates at exactly the same frequency as the transmitter master clock signal derived from the FSK generator 24 output signal on the signal path 26, described before with respect to the transmitter station 10.

The transmitted code data (the FSK signal imposed on the carrier signal) is received via the receiver 50 and the receiver 50 is constructed to detect the incoming signal providing an output signal corresponding to the FSK signal of the received transmitted code data signal, the FSK signal representing the received transmitted code data being provided via the receiver 50 output signal on the signal path 56. Only every other received logic level of the received transmitted logic levels represents a message bit since each message bit is followed by a complement message bit, as described before. Therefore, only every other received logic level or, in other words, only the received message bits are clocked into the shift registers 120 and 122, the received message bit complements being utilized as a means for automatically detecting errors in the signals received via the receiver station 12 (each received message bit must be followed by the message bit complement before the received message bits are clocked into the N-bit shift register 122), in a manner to be described in greater detail below.

The FSK demodulator 58 output on the signal path 64 is connected to the input of the one-bit shift register 120 and to one of the inputs of the exclusive OR gate 128, the signal on the signal path 64 being the demodulated, received FSK signal which included the transmitted message bits, the transmitted message bit complements, and the transmitted synchronization bits, i.e. the transmitted logic levels. The one-bit shift register 120 output signal 126 is connected to the other input of the exclusive OR gate 128 and thus the exclusive OR gate 128 compares the one-bit shift register 120 output signal with the FSK demodulator 58 output signal on the signal path 64, in a manner to be described in greater detail below.

The decoder control clock signal is connected to the AND gate 112 via the signal path 118 and produces clock pulses at one-half the frequency rate of the clock pulses produced via the receiver master clock signal on the signal path 62. When the decoder control clock signal on the signal path 118 is in the high state, the signal on the signal path 62 is in the high state and the AND gate 112 provides an output signal via the signal path 124, the AND gate 112 output signal providing the one-bit shift register clock signal for clocking data received via the FSK demodulator output signal path 64 into the one-bit shift register 120. By the same token, when the decoder control clock signal on the signal path 118 is in the low state and the receiver master clock signal on the signal path 62 is in the high state, the one-bit shift register clock signal is not connected to the one-bit shift register 120 via the signal path 124 since the AND gate 112 does not provide an output signal in this condition (the gate 112 output signal is in the low state). Thus, the one-bit shift register clock signal on the signal path 124 is controlled via the AND gate 112 such that data received via the FSK demodulator 58 output signal path 64 is clocked into the one-bit shift register 120 at one-half the frequency rate of the receiver master clock signal on the signal path 62 or, in other words, only every other logic level on the FSK demodulator 58 output signal path 64 is clocked into the 1-bit shift register 120, thereby maintaining synchronization of the operation of the one-bit shift register 120 such that only the message bits are clocked into the 1-bit shift register 120.

When a message bit is clocked into the 1-bit shift register 120 in a manner described before, the 1-bit shift register output signal on the signal path 126 has a logic level identical to the logic level of the FSK demodulator 58 output signal on the signal path 64 and thus the exclusive OR gate 128 output signal on the signal path 132 is in the low state. In this condition, the AND gate 130 is inhibited which inhibits the N-bit shift register clock signal on the signal path 136, and data is not clocked into the N-bit shift register 122.

When the complement message bit logic level is on the FSK demodulator 58 output signal path 64, the decoder control clock signal on the signal path 118 is in the low state and the 1-bit shift register clock signal is not connected to the 1-bit shift register 120 via the signal path 124, the signal on the signal path 124 being in the low state. Thus, the message bit complement is not clocked into the one-bit shift register 120 and the one-bit shift register 120 output signal on the signal path 126 has a logic level corresponding to the logic level of the message bit. In this condition, one of the inputs on the signal path 126 to the exclusive OR gate 128 has a logic level corresponding to the message bit and the other input on the signal path 64 to the exclusive OR gate 128 has a logic level corresponding to the complement message bit, the exclusive OR gate 128 output signal 132 being in the high state. When the exclusive OR gate 128 output signal on the signal path 132 is in the high state, an N-bit shift register clock signal is connected to the N-bit shift register 122 via the gates 114 and 130, and thus the message bit stored in the one-bit shift register 120 and appearing on the signal path 126 is clocked into the N-bit shift register 122. Thus, after a message bit has been validated against the message bit complement, the exclusive OR gate 128 output signal on the signal path 132 is in the high state and this signal will remain in the high state during the message bit complement time period and allow the AND gate 114 to operate providing an output signal via the signal path 134 and, when the signal on the signal path 134 changes from a high to a low state as controlled by the signal on the signal path 118, an N-bit shift register clock signal pulse is produced on the signal path 136 clocking the message bit into the N-bit shift register 122.

The one-shot multivibrator 128 generates an output signal pulse on the signal path 144 when a high to low transition occurs via the signal on the signal path 134, the one-shot multivibrator 138 output signal 144 remaining in the high state for a predetermined period of time such as for example one-tenth of a receiver master clock signal pulse width. When the one-shot multivibrator 138 output signal is in the high state and the output signal of the exclusive OR gate 128 on the signal path 132 is in the high state, the AND gate 140 operates providing an output signal via the signal path 152 during the period of time the one-shot multivibrator 138 output signal remains in the high state. Thus, when the message bit complement is on the signal path 64, a relatively short duration pulse occurs on the signal path 152 which will be clocked through the AND gate 150 when the inverter 116 output signal on the signal path 156 is in the high state.

The AND gate 150 output signal pulse is connected to the N-counter 158 via the signal path 160 and the N-counter 158 is incremented one count indicating that a message bit has been clocked into the N-bit shift register 122 and the message bit clocked into the N-bit shift register 122 has been followed by its complement (message bit complement). When the predetermined number (N) pulses have been counted by the N-counter 158 prior to the N-counter 158 being reset via a reset signal on the signal path 180, an N-counter 158 output signal is connected to the input of the M-counter 162 via the signal path 164. When the predetermined number (M) pulses have been connected to the M-counter 162 via the signal path 164 prior to a reset signal being connected to the M-counter 162 via the signal path 174, an M-counter 162 output signal in the high state is connected to the signal path 66, the M-counter 162 output signal in the high state on the signal path 62 being referred to herein as a "valid data signal."

During the operation of the receiver station 12, if the message bit complement is not present on the signal path 64 during that time when the signal on the signal path 156 is in the high state, the inverter 146 output signal on the signal path 148 will be in the high state allowing the AND gate 142 to be operative providing an output signal in the high state via the signal path 178 and the AND gate 140 is inoperative (no output signal) in this condition. Thus, one of the input signals to the AND gate 176 is in the high state (the signal on the signal path 178) and the other input connected to the AND gate 176 via the signal path 156 is also in the high state thereby allowing the AND gate 176 to operate (provide an output signal) and provide a control gate 176 output signal on the signal path 180 which is connected to the N-counter 158. The AND gate 176 output signal on the signal path 180 provides both a reset signal causing the N-counter 158 to be reset thereby signalling that an error has been detected or that a synchronization bit is present on the FSK demodulator 58 output signal on the signal path 64, and the N-counter 158 has already counted the predetermined number (N) message bits clocked into the N-bit shift register 122 (except where the receiver station 12 is receiving the first synchronization bit of a new transmission of data). In either event, the N-counter 158 is reset to increment the M-counter 162 when the predetermined number (N) message bits have been received or so that an N-counter 158 output signal is not connected to the M-counter 162 via the signal path 164 for a period of time allowing another predetermined number (N) message bits to be received and clocked into the N-bit shift register 122 to avoid an error (an erroneous message bit being clocked into the N-bit shift register 122).

The reset signal on the signal path 180 is also connected to the reset input of the counter 110. When the counter 110 is reset via a received reset signal on the signal path 180 indicating that a signal on the signal path 64 is not the complement of the message bit on the one-bit shift register 120 output signal, the one-bit shift register clock signal on the signal path 124 is inhibited and the N-bit shift register clock signal on the signal path 136 is also inhibited. In this manner, the digital decoder 60 is self-synchronizing since the first bit of every message code is transmitted from the transmitter station 10 and then repeated without the message bit complement prior to initiating the message bit and the message bit complement sequence produced by the digital encoder 18.

In essence, the transmission of at least two synchronization bits which have the same logic level as the first subsequent message bit "forces" an error condition in the receiver station 12 which resets the digital decoder 60 so that it is in a proper condition to detect the first message bit. Since the divide-by-two counter 110 produces a one-bit shift register clock signal via the signal path 118, the AND gate 112 and the signal path 124 every alternate receiver master clock signal pulse, at least one of the synchronization bits will be clocked into the 1-bit shift register 120. It is assured, therefore, that at least one error condition will be detected and the digital decoder 60 reset, since at least one of the bits immediately subsequent to the synchronization bit is the same logic level as the bit stored in the 1-bit shift register 120. As a consequence, the 1-bit shift register 120 is inhibited from clocking (see the 1-bit shift register 120 clock signal on the signal path 124 in FIG. 5) until after the message bit complement of the first message bit (i.e., the bit stored in the 1-bit shift register 120 since the logic level of the stored synchronization bit is the same as that of the first message bit) has been applied to the exclusive OR gate 128 via the signal path 64. Similarly, the N-bit shift register 122 is also prevented from clocking by the error condition until the message bit complement of the first message bit has been applied to the exclusive OR gate 128 via the signal path 64. Once the message bit complement is detected by the exclusive OR gate 128, the AND gate 130 allows the generation of an N-bit shift register clock signal on the signal path 136 under the control of the AND gate 114 as described above (see the N-bit shift register 122 clock signal on the signal path 136 in FIG. 5). The exclusive OR gate 128, therefore, maintains the digital decoder 60 in a reset condition so that the N-counter 158 initiates counting as soon as the first message bit has been correctly validated against the following message bit complement.

In the manner just described, the present invention provides a substantially 100 percent bit error detection and message synchronization accomplished via the same received signal comparisons. Also, only one message code bit period of time is required for synchronization.

It should be noted that, in addition to the complement error detection (the message bit followed by the message bit complement), an alternate system of error detection can be utilized with the present invention whenever the message is repeated. In this last-mentioned embodiment, the repeating of the message allows the use of a powerful error filter which is achieved when combined with the bit complement error detection method. More particularly, when the transmitted message code is repeated correctly a predetermined number of times, the message bits clocked into the N-bit shift register 122 will be identical in logic value to the message bit stored in the last (Nth) stage of the N-bit shift register 122 (the Nth stage is indicated via the signal on the signal path 168) each time a signal is present on a signal path 160 connected to the N-counter 158. Thus, the signal connected to the N-counter 158 via the signal path 160 is utilized to control the AND gate 170 which allows a reset signal to be connected to the M-counter 162 via the signal path 174 when the message bit being received via the receiver stataion 12 is not repeated on subsequent transmissions. In essence, this second error signal detects all errors which occur in even adjacent multiples whereas the complement error detector detects all odd and all even non-adjacent errors.

When a message code has been correctly received via the receiver station 12 and a valid data signal is connected to the signal path 66, the data signal lines and the clock signal lines can be deactivated via the valid data signal 66 until the message code stored in the N-bit shift register 122 is transferred to storage or processed via the signal paths 68.

To further illustrate the operation of the receiver station 12, the detected FSK signal (the receiver 50 output signal on the signal path 56) is illustrated in FIG. 5, assuming a 4 bit message code of: (0) — (1) — (0) — (1), the message code utilized to illustrate the operation of the transmitter station 10 shown in FIG. 4 and described before. The detected FSK signal on the signal path 56 is identical to the FSK generator 24 output signal. For the purpose of illustrating the various signals and the corresponding time relationships, the value of (P) is selected to be 1, the value of (N) is 4 corresponding to the 4 bit message code, the value of the predetermined number (M) is 2, as described before with respect to FIG. 4.

The value of (P) in the transmitter station 10 is identical to the value of (P) utilized in the receiver station 12. The receiver master clock signal on the signal path 62 produces one output clock signal pulse for each received one cycle of the FSK signal on the signal path 56. The receiver master clock signal is thus identical and synchronized in time with the transmitter master clock signal on the signal path 40, both clock signals having a frequency coherently related to the frequency of the FSK generator 24 output signal on the signal path 26 and received on the signal path 56, as diagrammatically shown in FIGS. 4 and 5.

The FSK demodulator 58 output signal on the signal path 64 is derived from the received FSK signal and corresponds identically to the digital encoder 18 output signal on the signal path 22. The demodulated FSK signal thus has logic levels corresponding to the message bits, the message bit complements, and the synchronization bits, the symbol (S) representing a synchronization bit, the symbol (D) representing a message bit, and the symbol (C) representing a message bit complement.

The clock signal on the signal path 134 and the 1-bit shift register clock signal on the signal path 124 are shown in FIG. 5, and the shaded areas under the pulse signals on the signal path 134 indicate that an N-bit shift register clock signal is present on the signal path 136 during the period of time represented via the shaded areas. As shown in FIG. 5, the 1-bit shift register 120 clock pulses on the signal path 124 appear first in time and clock the binary coded data on the signal path 64 into the 1-bit shift register 120. One cycle of the FSK signal later in time [a time representing 1 bit time], after the first message bit complement has appeared, the decoder control clock signal on the signal path 118 changes state and the inverter 116 connects a signal to the AND gate 114 connecting the N-bit shift register clock signal to the N-bit shift register 122 clocking the binary coded data on the signal path 126 into the N-bit shift register 122.

The 1-bit shift register clock signal is not connected to the 1-bit shift register 120 when the message bit complement is on the signal path 64 since the decoder control clock signal is in the low state and the 1-bit shift register clock signal is not connected through the AND gate 112 (the AND gate 112 is "inoperative" in this condition). The message bit complement on the signal path 64 is compared with the message bit previously clocked into the 1-bit shift register 120 and on the signal path 126 via the exclusive OR gate 128 which provides an output signal in the high state on the signal path 132 when the complement of the message bit stored in the 1-bit shift register 120 is on the signal path 64 indicating a valid message bit is on the signal path 126. In this condition, the valid message bit on the signal path 128 is clocked into the N-bit shift register 122.

When the signals on the signal paths 126 and 64 indicate that the message bit complement is on the signal path 64 with respect to the message bit on the signal path 126, a short duration pulse will appear on the signal path 144 which will be clocked through the AND gate 150 if the time frame is correct as determined by the inverter 116 output signal on the signal path 156, as indicated in FIG. 5. The N-counter 158 is incremented each time a valid message bit has been clocked into the N-bit shift register 122 followed by its message bit complement. The N-counter 158 produces an output signal when the predetermined number (N) input pulses have been connected thereto, the value of (N) being four in the example of signals illustrated in FIG. 5. The four output signal pulses connected to the N-counter 158 on the signal path 160 indicate that four valid message bits (the number of message bits in the illustrated message code) have been clocked into the N-bit shift register 122. When the message code has been repeatedly clocked into the N-bit shift register 122 the predetermined number (M) times, the M-counter output signal on the signal path 66 is changed to the high state producing the valid data signal.

When the complement of the message bit is not present on the signal path 64, a signal pulse in the high state is produced on the signal path 180 via the AND gate 176 resetting the N-counter 158. The N-counter 158 is reset by the signal pulse which is produced on the signal path 180 when either an error is detected or a synchronization bit is present on the signal path 64 and the N-counter 158 has already counted the predetermined number (N) input pulses. In either event, the N-counter 158 is reset. The signal pulse on the signal path 180 also resets the counter 110. The resetting of the counter 110 causes the one-bit shift register clock signal on the signal path 124 to be inhibited along with the N-bit shift register clock on the signal path 136, as indicated in FIG. 5 via the word INHIBIT, the word NORMAL and the corresponding symbols N being utilized in FIG. 5 to indicate the normal generation of shift register clock pulses on the signal paths 124 and 136. The inhibiting of the 1-bit shift register clock signal on the signal path 124 and the N-bit shift register clock signal on the signal path 136 is caused by the "error" introduced via the received synchronization bits, i.e. the received logic level is not followed by its complement.

The receiver station 12 thus checks the received binary coded data (the received logic levels) assuring that each message bit is followed by its complement and the receiver station 12 counts the number of times the correct message code has been received via the M-counter 162, the receiver station 12 being designed to receive the correct message code the predetermined number (M) times prior to generating the valid data signal. The value of (M) thus determines the probability of a random erroneous message code ($P_{EM}$) being clocked into the N-bit shift register 122 according to the following general expression:

$$P_{EM} \leqq \left[\left(\frac{1}{14}\right)\left(\frac{1}{N}\right)^{3}\right]^{M} \cdot \left[\frac{1}{N}\right]^{(M-1)2}$$

wherein:

(M) is selected to be equal to or greater than 2.

By way of example, if (N) is sixteen [a 16 bit message code] and (M) is equal to 2, the probability of clocking an erroneous message code into the N-bit shift register 122 is less than 1 in ($10^{-12}$) received message codes which at a bit rate of 3200 BPS (bits per second) would be one erroneous message code clocked into the N-bit shift register 122 every (630) years assuming transmission on a continuous basis and noise conditions of a nature producing a maximum possible number of errors. By way of comparison, a system utilizing an error detection method of redundancy wherein the received message code was determined to be repeatable four times prior to producing a code valid signal indicating a proper message code clocked into the N-bit shift register, the probability of a random erroneous message code ($P_{EM}$) being clocked into the N-bit shift register would be approximately $[(\frac{1}{4})\cdot(10)^{-5}]$ which would allow approximately 11 erroneous message codes to be clocked into the N-bit shift register per day — an error rate considerably higher than the error rate of the present invention.

The transmitter station 10 and the receiver station 12 provide a system for communicating binary coded data wherein the received logic levels (the message bits, the message bit complements and the synchronization bits) received via the receiver station 12 are coherently related and automatically synchronized with the logic levels transmitted via the transmitter station 10 by using the received FSK signal on the signal path 56 to derive the receiver master clock signal, the same FSK signal also being utilized to derive the transmitter master clock signal. Thus, separate master clock generators are not required for producing master clock pulses for operating the transmitter station 10 and the receiver station 12. The transmitter station 10 and the receiver station 12 utilize a cyclic complementary binary encoder and decoder method which is fully synchronized and the binary coded data is produced at a fixed BAUD rate for message transmission independent of the number of "zeros" and the number of "ones" in the communicated binary code. In other words, the message transmission time ($T_m$) is:

$$\left[\left(\frac{1}{f_s}\right) + \left(\frac{1}{f_m}\right)\right] \cdot N \text{ seconds}$$

independent of the number of "ones" and "zeros" in the (N) bit message code. Further, utilizing the method and apparatus of the present invention, only one transmitted message bit time (two synchronization bits) is required to synchronize the receiver station 12 decoder operation.

A code bit is transmitted every predetermined number (P) cycles of the FSK generator 24 output signal which has a frequency of ($f_s$) for (P/2) cycles and a frequency of ($f_m$) for (P/2) cycles when the transmitted code bit is a logical "zero," and a frequency of ($f_m$) for (P/2) cycles and a frequency of ($f_s$) for (P/2) cycles when the transmitted code bit is a logical "one." A new message code is transmitted automatically every predetermined number (NM) cycles of the FSK generator 24 output signal. The transmitted binary coded data is clocked into the receiver N-bit shift register 122 at exactly the same rate as the binary coded data is clocked from the transmitter N-bit shift register 86 thereby providing a fully coherent communication system.

The receiver station 12 operation is automatically synchronized with the transmitter station 10 operation utilizing the method and apparatus of the present invention without the necessity of transmitting any signals other than the FSK signals produced by the FSK generator 24. The FSK generator 24 can be designed to produce the optimum encoding frequencies for the particular communication data link utilized in a particular operational embodiment since the transmitter and the receiver clock signals are coherently related to the FSK generator 24 output signal independent or regardless of the selected frequencies ($f_s$) and ($f_m$). The method and the apparatus of the present invention thus provide a low cost, low error rate FSK communication system for transmitting and receiving binary coded data.

The transmitter station 10 and the receiver station 12 can thus be utilized in a one-way communication system in which a radio carrier signal is utilized to provide the particular data link 14, the method and the apparatus of the present invention being utilized to transmit time division binary message codes to control locks on vehicles, vehicle gates or doors, for example. In this particular operational embodiment, each control lock would include a receiver station 12 having a receiver message code uniquely identifying the particular receiver station 12 or, more particularly, the control lock, permanently encoded in the comparison network 67, and receiver 50 constructed to receive a modulated RF (radio-frequency) carrier signal. In this type of operational embodiment, a large number of message codes each identifying one particular control lock would have to be generated, transmitted and received in a substantially error-free manner, a type of requirement which is particularly suitable for the coherent, low error rate, fixed BAUD rate FSK communication method and apparatus of the present invention.

The method and apparatus of the present invention can also be utilized in a paging system wherein a predetermined message code uniquely identifying one predetermined individual is generated and transmitted via the transmitter station. Each individual utilizing the system carries a receiver station 12 permanently encoded with a predetermined, receiver code uniquely identifying the individual. When the receiver station 12 receives a transmitted message code exactly corresponding to the permanently encoded receiver code, the comparison signal is utilized to provide an audible or visual output signal indicating to the individual that he is being paged. Again, a rather large number of receiver codes are required and the system must be capable of transmitting and receiving message codes in a relatively error-free manner, a type of requirement which is again particularly suitable for the coherent, low error rate, fixed BAUD rate FSK communication method and apparatus of the present invention.

The method and apparatus described in detail before in connection with FIGS. 1 through 5, inclusive, can thus be utilized to communicate time division binary message codes in various one-way type of communication systems and the comparison signal can be utilized to provide an operator-perceivable feedback indication that a message code has been received corresponding identically to the particular permanent receiver code. In one other form, the transmitter station 10 can be constructed to receive the comparison signal generated and transmitted via a particular receiver station 12 thereby indicating to the transmitter station 10 operator that a receiver station 12 has been located with a permanent receiver code identically corresponding to the transmitted message code, for example. The method and apparatus can also be utilized in a two-way communication system, and one example of such a system is shown in FIG. 6 and described below.

Figure 6:
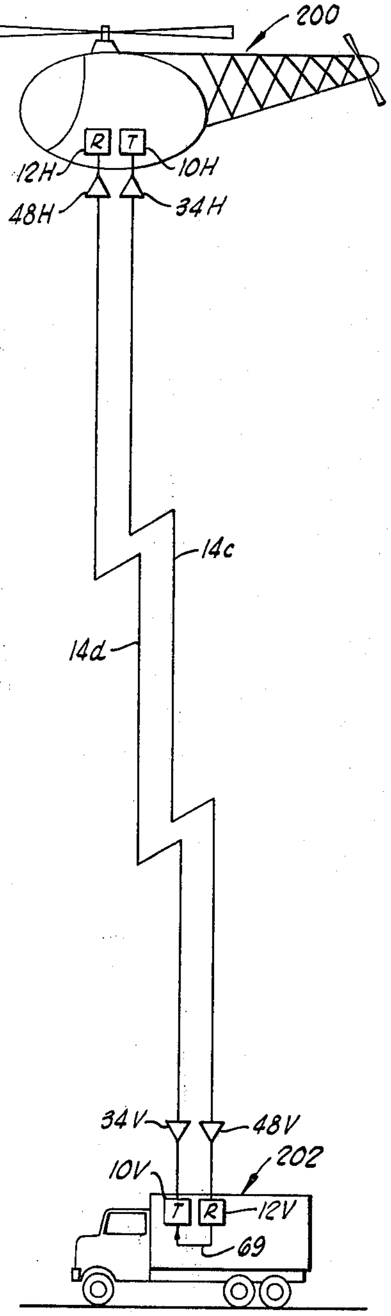
FIG. 6 is a diagrammatic view showing one operational embodiment of the method and apparatus of the present invention.

Embodiment of FIG. 6

As mentioned before, the transmitter station 10 is constructed to transmit the binary coded data for a predetermined period of time determined by the value of (M) of the M-counter 42, and then the transmitter station 10 is rendered inoperative (no data is transmitted) for the same predetermined period of time determined by the same value of (M). This particular aspect of the present invention is particularly useful in two-way communication systems between an interrogator unit which may have a fixed location or which may be mobile and a fixed or a mobile transponder unit constructed to respond when receiving a proper, predetermined message code.

Shown in FIG. 6 is one operational embodiment utilizing the method and the apparatus of the present invention in one type of two-way communication, for example, the apparatus including transmitter stations and receiver stations constructed in a manner similar to that described in detail before with respect to the transmitter station 10 and the receiver station 12. In this particular operational embodiment, a transmitter station and a receiver station are each located in a mobile interrogator unit or, more particularly, a helicopter, the helicopter being designated in the drawings via the general reference numeral 200 and the transmitter station and the receiver station in the helicopter 200 being more particularly identified via the reference numerals 10H and 12H indicating the location of the transmitter station and the receiver station within the helicopter 200. Another transmitter station and anothe receiver station are each located in a mobile responder unit or, more particularly, a vehicle 202, the transmitter station and the receiver station being more particularly identified via the reference numerals 10V and 12V indicating the location of the transmitter station and the receiver station in the vehicle 202. It should be noted that, in some applications, the transmitter station and the receiver station indicated in FIG. 6 to be located in the vehicle unit 202 may also be located in a particular cargo storage package or the like depending upon the particular operational embodiment of the invention.

In operation, the operator inserts a predetermined message code uniquely identifying the vehicle 202 into the transmitter station 10H via the data entry assembly 16, in a manner described before. The operator then activates the transmitter station 10H by placing the FSK generator 24 in the "on" position and the message code is transmitted in the predetermined transmitted code format, described before, on a data link 14c or, more particularly, a UHF down link 14*c* radio carrier signal via the transmitter antenna, designated in FIG. 6 by the reference numeral 34H. After the message code has been transmitted a predetermined number (M) times via the transmitter station 10H [the predetermined number "M" being described before with respect to the transmitter station 10 shown in FIGS. 1 and 2 ] the helicopter 200 transmitter modulator 28 is rendered inoperative via the M-counter 42 output signal and the transmitter station 10H remains inoperative for the predetermined (M) period of time for receiving any incoming signals (the transmitter modulator 28 and the M-counter 42 being shown in FIGS. 1 and 2 and described in detail before).

The receiver station 12V receives the UHF signal on the UHF down link 14*c* via the receiver antenna 48V. The received binary coded data modulated onto the UHF carrier signal is detected by the receiver 50 and the FSK signal is demodulated by the FSK demodulator 58 in a manner described before with respect to the receiver station 12 shown in FIGS. 1 and 3. When an error-free message code is clocked into the N-bit shift register located in the receiver station 12V, the message code is compared with a predetermined message code uniquely identifying the vehicle 202, the message code being connected to the comparison network 67 via the parallel signal paths 68 connected to the receiver N-bit shift register 122 as shown in FIG. 3, and the comparison signal on the signal path 69 is generated via the comparison network 67 indicating the received message code is identical to the predetermined message code uniquely identifying the vehicle 202. In this embodiment of the invention the valid data signal on the signal path 66 is preferably connected to the comparison network 67 and the comparison network 67 is activated in response to a received valid data signal to compare the message code received from the N-bit shift register 122 with the predetermined message code uniquely identifying the vehicle 202.

The comparison signal on the signal path 69 is connected to the vehicle transmitter station 10V and the identical message code or some other predetermined message code entered into the digital encoder 18 is transmitted via the transmitter station 10V in response to the received comparison signal on the signal path 69. The comparison signal on the signal path 69 can be connected to the FSK generator 24 of the transmitter station 10V to activate the FSK generator 24 for automatically operating the transmitter station 10V. The message code is transmitted by the transmitter station 10V via a VHF uplink (the data link 14d), the transmitter antenna 34V and the receiver antenna 48H connecting the VHF uplink 14*d*.

The message code transmitted via the vehicle 202 transmitter station 10V is received via the helicopter 200 receiver station 12H, and compared with the message code transmitted by the helicopter 200 transmitter station 10H. If the received message code compares identically with the transmitted message code, a comparison signal is sent to the operator of the helicopter 200 via the comparison network 67 on the signal path 69 of the helicopter 200 receiver station 12H, the comparison signal being of the audio or the visual type and providing an operator-perceivable output indication to the helicopter 200 operator that a vehicle 202 has been located having a message code uniquely identifying the vehicle 202 and exactly corresponding to the message code transmimtted via the helicopter 200 transmitter station 10H.

The two-way communication system shown in FIG. 6 is particularly useful in utilizing helicopters to locate particular vehicles or cargo storage packages which may have been stolen or lost, the vehicles or cargo packages each having a transponder unit comprising a receiver station and a transmitter station constructed in a manner like that described with respect to the transmitter station 10V and the receiver station 12V wherein each transponder unit is constructed to receive and decode the binary coded data modulated onto the UHF carrier signal. In this embodiment of the invention, the transmitter stations 10H and 10V are each constructed exactly like the transmitter station 10 (shown in FIGS. 1 and 2) except for the design differences resulting from the difference in radio carrier frequencies (the UHF down link and the VHF uplink)

which are well-known in the art. Further, the receiver stations 12H and 12V are each constructed exactly like the receiver stations 12 (shown in FIGS. 1 and 3) except for the design differences resulting from the difference in radio carrier frequencies (the UHF down link and the VHF uplink) which are well-known in the art.

To control the range of operation, the power and the sensitivity of the UHF and the VHF transmitter stations 10H and 10V are adjusted to allow operation within a predetermined range.

To further illustrate the construction of the apparatus of the present invention, the following commercially available components and assemblies were utilized to construct the transmitter station and the receiver station in one operational application of the present invention.

| | Part or Model No. | Typical Manufacturer |
|---|---|---|
| Data Entry Assembly 16 | 197656G | EECO |
| FSK Generator 24 | XR2307 | Exar |
| Transmitter Modulator 28 UHF | ZAD-1H | Mini-Circuits Lab. |
| Transmitter Modulator 28 VHF | SRA-1 | Mini-Circuits Lab. |
| Transmitter 30 UHF | AP-500 | Avantek |
| Transmitter 30 VHF | LP2000 | Lithic Systems, Inc. |
| FSK Demodulator 58 | XR210 | Exar |
| Receiver 50 UHF | AD1202 | Aertech |
| Receiver 50 VHF | LM372 | National Semiconductor |
| M-counters 42 and 162 | 7473 | Texas Instruments |
| P-counters 38 and 54 | 7473 | Texas Instruments |
| N-counters 74 and 158 | 7473 | Texas Instruments |
| N-bit shift registers 88 and 122 | 74198 | Texas Instruments |
| One-bit shift register 120 | 7473 | Texas Instruments |
| Counters 72, 76, 84 and 110 | 7473 | Texas Instruments |
| AND Gates 96, 100, 112, 114, 130, 140, 142, 150, 170 and 176 | 7408 | Texas Instruments |
| OR Gates 70 and 104 | 7482 | Texas Instruments |
| Exclusive OR Gates 128 and 166 | 7486 | Texas Instruments |
| Inverters 94, 102, 116 and 146 | 7404 | Texas Instruments |

Changes may be made in the various components and assemblies and in the steps of the method described herein without departing from the spirit and the scope of the invention as defined in the following claims.

What is claimed is:

1. A frequency shift key (FSK) communication apparatus for communicating time division binary message codes comprising a predetermined number of message bits, having logic levels representing logical "ones" and logical "zeros", from a transmitter station to a receiver station, the apparatus comprising:

a digital encoder in the transmitter station, having a predetermined message code comprising a predetermined number (N) message bits, generating at least two output signal levels for each message bit of the N-bit message code at a digital encoder output signal;

an FSK generator in the transmitter station receiving the digital encoder output signal and providing an output signal having a distinct frequency in response to each received digital encoder output signal level, the FSK generator output signal having a fixed transmission time for the (N) bit message code independent of the number of logical "ones" and logical "zeros" comprising the (N) bit message code;

means in the transmitter station receiving the FSK generator output signal and providing a transmitter master clock signal derived from the received FSK generator output signal and having a frequency coherently related to the FSK generator output signal frequency, the transmitted master clock signal being connected to the digital encoder and operating the digital encoder to provide the digital encoder output signal in one condition of the digital encoder;

means in the transmitter station receiving and transmitting the FSK generator output signal;

means in the receiver station receiving the transmitted FSK generator output signal and providing an output signal corresponding to the received FSK generator output signal;

means in the receiver station receiving the output signal corresponding to the transmitted FSK generator output signal and providing a receiver master clock signal derived from the received FSK generator output signal and having a frequency coherently related to the FSK generator output signal frequency; and means in the receiver station receiving the receiver master clock signal, receiving the output signal corresponding to the transmitted FSK generator output signal and decoding the transmitted FSK generator output signal to derive the transmitted message code, the receiver master clock signal providing the receiver master clock signal pulses for decoding the transmitted FSK generator output signal at a frequency coherently related to the frequency of the transmitter master clock signal.

2. The apparatus of claim 1 wherein the means in the transmitter station receiving and transmitting the FSK generator output signal is defined further to include:

a transmitter modulator in the transmitter station, having an activated condition, receiving the FSK generator output signal and providing an output signal in the activated condition thereof; and a transmitter generator a carrier signal and receiving the transmitter modulator output signal, the carrier signal being modulated via the FSK generator output signal provided via the transmitter modulator output signal; and wherein the means in the receiver station receiving the transmitted FSK generator output signal is defined further to include: a receiver receiving the transmitted carrier signal modulated via the FSK generator output signal and providing the FSK generator output signal via the output signal therefrom; and wherein the means in the receiver station decoding the transmitted FSK generator output signal is defined further to include:

an FSK demodulator receiving the receiver output signal and providing a time division binary coded output signal in response thereto, the FSK demodulator output signal corresponding to the digital encoder output signal; and a digital decoder receiving the receiver master clock signal, the FSK demodulator output signal and decoding the FSK demodulator output signal to derive the transmitted message code.

3. The apparatus of claim 2 defined further to include:

a comparison network in the receiver station, having a receiver code encoded therein, connected to the digital decoder, the comparison network receiving the derived transmitted message code, comparing the transmitted message code with the receiver code and providing comparison signal in response to an identical comparison of the receiver code and the transmitted message code.

4. The apparatus of claim 1 wherein the digital encoder is defined further as generating the message bit followed by the message bit complement for each message bit of the (N) bit message code; and wherein the FSK generator provides an output signal having the frequency ($f_s$) in response to a received digital encoder output signal having a logic level representing a message bit of logical "zero" and then provides an output signal having the frequency ($f_m$) in response to a received digital encoder output signal having a logic level representing a message bit complement of logical "one" for each message bit of logical "zero" in the (N) bit message code, and provides the output signal having the frequency ($f_m$) in response to a received digital encoder output signal having a logic level representing a message bit of logical "one" and then provides the output signal having the frequency ($f_s$) in response to a received digital encoder output signal having a logic level representing a message bit complement of logical "zero" for each message bit of the (N) bit message code of logical "one."

5. The apparatus of claim 1 wherein the means providing the transmitter master clock signal is defined further to include:

a P-counter receiving the FSK generator output signal and providing a transmitter master clock signal pulse in response to each predetermined number (P) cycles of the received FSK generator output signal; and wherein the means providing the receiver master clock signal is defined further to include:

a P-counter receiving the output signal corresponding to the transmitted FSK generator output signal and providing a receiver master clock pulse in response to each predetermined number (P) cycles of the received output signal corresponding to the FSK generator output signal.

6. The apparatus of claim 1 wherein the digital encoder is defined further to include:

means receiving the transmitter master clock signal and providing a shift register clock signal in response thereto, the shift register clock signal having a frequency coherently related to the transmitter master clock signal frequency;

an N-bit shift register receiving the shift register clock signal, having a portion for receiving an N-bit message code and providing an output signal, each message bit of the N-bit message code received via the N-bit shift register being clocked from the N-bit shift register in a serial manner in response to the received shift register clock signal pulses;

means connected to the N-bit shift register for providing the N-bit message code to the N-bit shift register in one condition; and means receiving the N-bit shift register output signal, having a portion generating a message bit complement for each message bit clocked from the N-bit shift register and providing the message bit followed by the message bit complement for each message bit of the (N) bit message code in a serial manner via an output signal, said last-mentioned output signal being the digital encoder output signal.

7. The apparatus of claim 6 wherein the FSK generator is defined further as providing an output signal having a frequency ($f_s$) in response to a received digital encoder output signal having a logic level representing a message bit of logical "zero" and then providing the output signal having the frequency ($f_m$) in response to a received digital encoder output signal having a logic level representing a message bit complement of logical "one" for each message bit of logical "zero" in the (N) bit message code, and providing the output signal having the frequency ($f_m$) in response to a received digital encoder output signal having a logic level representing a message bit of logical "one" and then providing the output signal having the frequency ($f_s$) in response to a received digital encoder output signal having a logic level representing a message bit complement of logical "zero" for each message bit of the (N) bit message code of logical "one."

8. The apparatus of claim 6 wherein the means in the receiver station decoding the transmitted FSK generator output signal is defined further to include:

an FSK demodulator receiving the signal corresponding to the FSK generator output signal and providing a time divisison binary coded output signal in response thereto, the FSK demodulator output signal corresponding to the digital encoder output signal; and a digital decoder, comprising:

means receiving the receiver master clock signal and providing a shift register clock signal in response thereto, the shift register clock signal having a frequency coherently related to the receiver master clock signal frequency;

an N-bit shift register, having one portion for receiving the shift register clock signal and another portion for receiving message bits, a message bit being clocked into the N-bit shift register in a serial manner when receiving a message bit and a shift register clock signal pulse; and means receiving the FSK demodulator output signal and providing an output signal connecting each message bit provided via the FSK demodulator output signal to the N-bit shift register, the message bits being clocked into the N-bit shift register via the shift register clock signal.

9. The apparatus of claim 8 wherein the means connecting each message bit to the N-bit shift register is defined further to include:

means receiving the FSK demodulator output signal, comparing each message bit received via the FSK demodulator output signal with the following data bit received via the FSK demodulator output signal, and providing a high output signal in response to each received message bit when followed by the message bit complement and providing a low output signal in response to each received message bit followed by a data bit other than the message bit complement of the preceding message bit; and means receiving the shift register clock signal, receiving the output signal from the means comparing each message bit received via the FSK demodulator output signal with the next received data bit, and providing the shift register clock signal to the N-bit shift register in response to a received high output signal from the means comparing each message bit with the next received data bit, thereby clocking the message bit into the N-bit shift register.

10. The apparatus of claim 9 wherein the means comparing each message bit with the following code bit is defined further to include:

a 1-bit shift register receiving the FSK demodulator output signal, each received data bit being clocked into the 1-bit shift register when receiving a 1-bit shift register clock signal pulse, and providing the received data bit via an output signal connected to the N-bit shift register;

means receiving the receiver master clock signal and providing a 1-bit shift register clock signal, the 1-bit shift register clock signal being connected to the 1-bit shift register for clocking only the received message bits into the 1-bit shift register, each message bit clocked into the 1-bit shift register being provided via the 1-bit shift register output signal; and gate means receiving the 1-bit shift register output signal and the FSK demodulator output signal, providing a high output signal when receiving a message bit via the 1-bit shift register output signal and the complement of the message bit on the 1-bit shift register output signal via the FSK demodulator output signal, and providing a low output signal when receiving a message bit via the 1-bit shift register output signal and a data bit other than the complement of the message bit on the 1-bit shift register output signal via the FSK demodulator output signal; and wherein the means providing the shift register clock signal to the N-bit shift register in response to a received high output signal is defined further as receiving the shift register clock signal and the gate means output signal, the message bit provided via the one-bit shift register output signal being clocked into the N-bit shift register via the shift register clock signal in the high condition of the gate means output signal.

11. The apparatus of claim 8 defined further to include:

means generating an output signal in response to a message bit being clocked into the N-bit shift register indicating a message bit followed by the message bit complement received via the receiver station;

an N-counter receiving the output signal generated in response to a message bit being clocked into the N-bit shift register and providing an output signal in response to a predetermined number (N) received signals indicating a predetermined number (N) message bits clocked into the N-bit shift register; and an M-counter receiving the N-counter output signal and providing a valid data signal in response to a received predetermined number (M) N-counter output signal pulses indicating the predetermined number (N) message bits clocked into the N-bit shift register a predetermined number (M) times.

12. The apparatus of claim 11 wherein the digital encoder is defined further to include:

means producing a synchronization signal prior to the generation of each of the message bits followed by the message bit complement for the (N) bit message code, the synchronization signal being provided via the digital encoder output signal; and wherein the digital decoder is defined further to include:

means connected to the N-counter producing a reset signal in response to a received synchronization signal resetting, the reset signal being connected to and resetting the N-counter.

13. The apparatus of claim 6 wherein the means providing the message bit followed by the message bit complement for each message bit of the (N) bit message code is further defined as providing the message bit during a half cycle of the shift register clock signal pulse and the message bit complement during the next half cycle of the shift register clock signal pulse in a serial manner for each message bit of the (N) bit message code.

14. The apparatus of claim 13 wherein the means providing the message bit followed by the message bit complement is defined further to include a portion producing the first message bit of the (N) bit message code during the first half cycle of the shift register clock signal and during the next half cycle of the shift register clock signal immediately prior to producing the message bit and message bit complement sequence in a serial manner for each message bit of the (N) bit message code, the signal produced during the first half cycle and the next half cycle of the shift register clock signal providing a synchronization signal.

15. The apparatus of claim 6 wherein the means generating the message bits and the message bit complements is defined further to include:

gate means receiving the shift register clock signal and the N-bit shift register output signal providing an output signal having a logic level corresponding to the message bit logic level on the N-bit shift register output signal when receiving a shift register clock signal in the high state;

an inverter receiving the shift register clock signal and providing an output signal in the high state in response to a received shift register clock signal in the low state and providing an output signal in the low state in response to a received shift register clock signal in the high state;

an inverter receiving the N-bit shift register output signal and providing an output signal in the high state in response to a received N-bit shift register output signal in the low state and providing an output signal in the low state in response to a received N-bit shift register output signal in the high state;

gate means receiving the first-mentioned inverter output signal and receiving the second-mentioned inverter output signal and providing an output signal having a logic level corresponding to the complement of the message bit on the N-bit shift register output signal in a low state of the shift register clock signal; and means receiving the first-mentioned gate means output signal and receiving the last-mentioned gate means output signal and providing the digital encoder output signal having a logic level corresponding to the message bit clocked from the N-bit shift register in the high state of the shift register clock signal and providing the digital encoder output signal having a logic level corresponding to the complement of the message bit clocked from the N-bit shift register in the low state of the shift register clock signal.

16. The apparatus of claim 15 wherein the means providing the transmitter shift register clock signal includes:

a counter receiving the transmitter master clock signal and providing the shift register clock signal having a frequency of one-half the frequency of the received transmitter master clock signal, the message bit being provided during a half cycle of the shift register clock signal in the high state of the shift register clock signal and the complement of the preceding message bit being provided during the next half cycle of the shift register clock signal in the low state of the shift register clock signal.

17. The apparatus of claim 15 wherein the transmitter N-bit shift register output signal is connected to the input of the N-bit shift register, the message bit clocked from the N-bit shift register being clocked back into the N-bit shift register and the message bits of the N-bit message code being provided cyclically via the N-bit shift register output signal.

18. The apparatus of claim 17 wherein the means transmitting the FSK generator output signal has an operative and an inoperative condition, said means transmitting the FSK generator output signal in the operative condition thereof; and wherein the apparatus is defined further to include:

an M-counter connected to the digital encoder and the means transmitting the FSK generator output signal, the M-counter providing an output signal in the high state connected to the means transmitting the FSK generator output signal and rendering the means transmitting the FSK generator output signal inoperative in response to the N-bit message code being repeated a predetermined number (M) times, the M-counter output signal being returned to the low state in a predetermined period of time corresponding to the time required to repeat the N-bit message code the predetermined number (M) times.

19. The apparatus of claim 15 defined further to include:

first counter means receiving the shift register clock signal and counting the number of message bits clocked from the N-bit shift register in an activated condition of the first counter means, the first counter means producing an output signal in the high state in response to the predetermined number (N) message bits being clocked from the N-bit shift register;

gate means receiving the transmitter master clock signal and the first counter means output signal, the gate means providing the transmitter master clock signal in the low state of the received first counter means output signal and inhibiting the transmitter master clock signal in the high state of the first counter means output signal; and second counter means receiving the transmitter master clock signal and providing an output signal in the high state in response to a received predetermined number of transmitter master clock signal pulses in an activated condition of the second counter means, the second counter means receiving the first counter means output signal and being activated in response to a received first counter means output signal in the low state, the second counter means output signal being connected to the first counter means and activating and resetting the first counter means in the low state of the second counter means output signal, the first message bit of the N-bit message code being provided via the digital encoder output signal in the high state of the second counter means and the digital encoder output produced in the high state of the second counter means being produced prior to the generation of the message bits and the message bit complements of the N-bit message code and providing a synchronization signal.

20. The apparatus of claim 16 wherein the means providing the receiver shift register clock signal includes:

a counter receiving the receiver master clock signal and providing an output signal having a frequency of one-half the frequency of the received receiver master clock signal;

gate means receiving the counter output signal having a frequency one-half the frequency of the receiver master clock signal and receiving the receiver master clock signal and providing a 1-bit shift register clock signal pulse in the high state of the counter output signal having a frequency one-half the frequency of the receiver master clock signal and in the high state of the receiver master clock signal;

a 1-bit shift register receiving the FSK demodulator output signal and the 1-bit shift register clock signal, the data bit on the FSK demodulator output signal being clocked into the 1-bit shift register in response to a received 1-bit shift register clock signal pulse, the 1-bit shift register clock signal clocking only the message bits into the 1-bit shift register and the message bit complements being on the received FSK demodulator output signal in the low state of the 1-bit shift register clock signal, each message bit clocked into the 1-bit shift register being provided via the 1-bit shift register output signal;

gate means receiving the 1-bit shift register output signal and the FSK demodulator output signal, providing a high output signal when receiving a message bit via the 1-bit shift register output signal and the complement of the message bit on the 1-bit shift register output signal via the FSK demodulator output signal, and providing a low output signal when receiving a message bit via the 1-bit shift register output signal and a data bit other than the complement of the message bit on the 1-bit shift register output signal via the FSK demodulator output signal;

means receiving the counter output signal having a frequency of one-half of the receiver master clock signal frequency and the last-mentioned gate means output signal, and providing a shift register clock signal pulse corresponding to the counter output signal having a frequency of one-half the receiver master clock signal frequency when receiving the last-mentioned gate means output signal in the high state indicating a message bit on the 1-bit shift register output signal and the complement of the message bit on the 1-bit shift register output signal being received via the FSK demodulator output signal; and an N-bit shift register having one portion receiving the shift register clock signal and another portion receiving the 1-bit shift register output signal, the message bit on the 1-bit shift register clock signal being clocked into the N-bit shift register when receiving a shift register clock signal pulse.

21. The apparatus of claim 20 wherein the means providing the shift register clock signal in the receiver includes:

an inverter receiving the counter output signal having a frequency of one-half the frequency of the receiver master clock signal frequency, and providing an output signal in the high state in response to a received signal in the low state and providing an output signal in the low state in response to a received signal in the high state;

an AND gate receiving the inverter output signal and the receiver master clock signal, and providing the inverter output signal via an AND gate output signal in the high state of the received receiver master clock signal; and an AND gate receiving the first-mentioned AND gate output signal and the gate means output signal having a high state indicating a received message bit followed by the complement of the received message bit, the last-mentioned gate means providing the shift register clock signal corresponding to the inverter output signal in the high state of the received gate means output signal indicating a message bit on the one-bit shift register output signal followed by the complement of the message bit.

22. The apparatus of claim 21 wherein the digital encoder is defined further to include: means producing a synchronization signal, having a logic level corresponding to the logic level of the first message bit of the N-bit message code and a time duration corresponding to the duration of two first message bits, the synchronization signal being produced immediately prior to producing the message bit and the message bit complement sequence; and wherein the apparatus includes:

means in the receiver station receiving the shift register clock signal and providing an output signal pulse indicating a message bit being clocked into the N-bit shift register;

an N-counter receiving the output signal pulse indicating a message bit being clocked into the N-bit shift register and providing an output signal pulse in response to a predetermined number (N) of input signal pulses received thereby;

means receiving the gate means output signal indicating a received message bit followed by the message bit complement and providing an output reset signal in the high state in the low state of the received gate means output signal, the output reset signal being connected to and resetting the N-counter in the high state of the output reset signal, the N-counter being reset in response to the two received synchronization bits and in response to an error indicating a received message bit followed by a data bit other than the message bit complement; and an M-counter receiving the N-counter output signal and providing an output valid data signal in response to a predetermined number (M) received N-counter output signal pulses indicating the (N) message bits and the (N) message bit complements received a predetermined number (M) times.

23. The apparatus of claim 22 wherein the counter providing the output signal having a frequency of one-half the frequency of the receiver master clock signal frequency is defined further as receiving the output reset signal and being reset in the high state of the output reset signal thereby inhibiting the 1-bit shift register clock signal and inhibiting the shift register clock signal until the detection of a message bit complement via the gate means providing an output signal indicating a received message bit and a received message bit complement.

24. The apparatus of claim 23 defined further to include:

means comparing each message bit of a received N-bit message code with the corresponding message bit of the preceding received N-bit message code and providing an output reset signal in response to a difference in the compared message bits, the output reset signal being connected to and resetting the M-counter and the N-counter thereby substantially assuring the repeatability of the received message code.

25. A frequency shift key (FSK) communication apparatus for communicating time division binary message codes comprising a predetermined number of message bits, having logic levels representing logical "ones" and logical "zeros," from a transmitter station to a receiver station, the apparatus comprising:

a digital encoder, having a predetermined message code comprising a predetermined number (N) message bits, generating at least two output signal levels for each message bit of the N-bit message code at a digital encoder output signal;

an FSK generator receiving the digital encoder output signal and providing an output signal having a distinct frequency in response to each received digital encoder output signal level, the FSK generator output signal having a fixed transmission time for the (N) bit message code independent of the number of logical "ones" and logical "zeros" comprising the (N) bit message code; and means receiving the FSK generator output signal and providing a transmitter master clock signal derived from the received FSK generator output signal and having a frequency coherently related to the FSK generator output signal frequency, the transmitter master clock signal being connected to the digital encoder and operating the digital encoder to provide the digital encoder output signal in one condition of the digital encoder.

26. The apparatus of claim 25 wherein the digital encoder is defined further as generating the message bit followed by the message bit complement for each message bit of the (N) bit message code; and wherein the FSK generator provides an output signal having the frequency ($f_s$) in response to a received digital encoder output signal having a logic level representing a message bit of logical "zero" and then provides an output signal having the frequency ($f_m$) in response to a received digital encoder output signal having a logic level representing a message bit complement of logical "one" for each message bit of logical "zero" in the (N) bit message code, and provides the output signal having the frequency ($f_m$) in response to a received digital encoder output signal having a logic level representing a message bit of logical "one" and then provides the output signal having the frequency ($f_s$) in response to a received digital encoder output signal having a logic level representing a message bit complement of logical "zero" for each message bit of the (N) bit message code of logical "one."

27. The apparatus of claim 26 wherein the means providing the transmitter master clock signal is defined further to include:

a P-counter receiving the FSK generator output signal and providing a transmitter master clock signal pulse in response to each predetermined number (P) cycles of the received FSK generator output signal; and wherein the means providing the receiver master clock signal is defined further to include:

a P-counter receiving the output signal corresponding to the transmitted FSK generator output signal and providing a receiver master clock pulse in response to each predetermined number (P) cycles of the received output signal corresponding to the FSK generator output signal.

28. The apparatus of claim 25 wherein the digital encoder is defined further to include:

means receiving the transmitter master clock signal and providing a shift register clock signal in response thereto, the shift register clock signal having a frequency coherently related to the transmitter master clock signal frequency;

an N-bit shift register receiving the shift register clock signal, having a portion for receiving an N-bit message code and providing an output signal, each message bit of the N-bit message code received via the N-bit shift register being clocked from the N-bit shift register in a serial manner in response to the received shift register clock signal pulses;

means connected to the N-bit shift register for providing the N-bit message code to the N-bit shift register in one condition; and means receiving the N-bit shift register output signal, having a portion generating a message bit complement for each message bit clocked from the N-bit shift register and providing the message bit followed by the message bit complement for each message bit of the (N) bit message code in a serial manner via an output signal, said last-mentioned output signal being the digital encoder output signal.

29. The apparatus of claim 28 wherein the FSK generator is defined further as providing an output signal having a frequency ($f_s$) in response to a received digital encoder output signal having a logic level representing a message bit of logical "zero" and then providing the output signal having the frequency ($f_m$) in response to a received digital encoder output signal having a logic level representing a message bit complement of logical "one" for each message bit of logical "zero" in the (N) bit message code, and providing the output signal having the frequency ($f_m$) in response to a received digital encoder output signal having a logic level representing a message bit of logical "one" and then providing the output signal having the frequency ($f_s$) in response to a received digital encoder output signal having a logic level representing a message bit complement of logical "zero" for each message bit of the (N) bit message code of logical "one."

30. The apparatus of claim 28 wherein the means providing the message bit followed by the message bit complement for each message bit of the (N) bit message code is further defined as providing the message bit during a half cycle of the shift register clock signal pulse and the message bit complement during the next half cycle of the shift register clock signal pulse in a serial manner for each message bit of the (N) bit message code.

31. The apparatus of claim 29 wherein the means providing the message bit followed by the message bit complement is defined further to include a portion producing the first message bit of the (N) bit message code during the first half cycle of the shift register clock signal and during the next half cycle of the shift register clock signal immediately prior to producing the message bit and message bit complement sequence in a serial manner for each message bit of the (N) bit message code, the signal produced during the first half cycle and the next half cycle of the shift register clock signal providing a synchronization signal.

32. The apparatus of claim 25 wherein the digital encoder is defined further to include:

means receiving the transmitter master clock signal and providing a shift register clock signal in response thereto, the shift register clock signal having a frequency coherently related to the transmitter master clock signal frequency;

an N-bit shift register receiving the shift register clock signal, having a portion for receiving an N-bit message code and providing an output signal, each message bit of the N-bit message code received via the N-bit shift register being clocked from the N-bit shift register in a serial manner in response to the received shift register clock signal pulses;

means connected to the N-bit shift register for providing the N-bit message code to the N-bit shift register in one condition; and means receiving the N-bit shift register output signal, having a portion generating a message bit complement for each message bit clocked from the N-bit shift register and providing the message bit followed by the message bit complement for each message bit of the (N) bit message code in a serial manner via an output signal, said last-mentioned output signal being the digital encoder output signal.

33. The apparatus of claim 32 wherein the means generating the message bits and the message bit complements is defined further to include:

gate means receiving the shift register clock signal and the N-bit shift register output signal providing an output signal having a logic level corresponding to the message bit logic level on the N-bit shift register output signal when receiving a shift register clock signal in the high state;

an inverter receiving the shift register clock signal and providing an output signal in the high state in response to a received shift register clock signal in the low state and providing an output signal in the low state in response to a received shift register clock signal in the high state;

an inverter receiving the N-bit shift register output signal and providing an output signal in the high state in response to a received N-bit shift register output signal in the low state and providing an output signal in the low state in response to a received N-bit shift register output signal in the high state;

gate means receiving the first-mentioned inverter output signal and receiving the second-mentioned inverter output signal and providing an output signal having a logic level corresponding to the complement of the message bit on the N-bit shift register output signal in a low state of the shift register clock signal; and means receiving the first-mentioned gate means output signal and receiving the last-mentioned gate means output signal and providing the digital encoder output signal having a logic level corresponding to the message bit clocked from the N-bit shift register in the high state of the shift register clock signal and providing the digital encoder output signal having a logic level corresponding to the complement of the message bit clocked from the N-bit shift register in the low state of the shift register clock signal.

34. The apparatus of claim 33 wherein the means providing the transmitter shift register clock signal includes:

a counter receiving the transmitter master clock signal and providing the shift register clock signal having a frequency of one-half the frequency of the received transmitter master clock signal, the message bit being provided during a half cycle of the shift register clock signal in the high state of the shift register clock signal and the complement of the preceding message bit being provided during the next half cycle of the shift register clock signal in the low state of the shift register clock signal.

35. The apparatus of claim 33 wherein the transmitter N-bit shift register output signal is connected to the input of the N-bit shift register, the message bit clocked from the N-bit shift register being clocked back into the N-bit shift register and the message bits of the N-bit message code being provided cyclically via the N-bit shift register output signal.

36. The apparatus of claim 35 wherein the means transmitting the FSK generator output signal has an operative and an inoperative condition, said means transmitting the FSK generator output signal in the operative condition thereof; and wherein the apparatus is defined further to include:

an M-counter connected to the digital encoder and the means transmitting the FSK generator output signal, the M-counter providing an output signal in the high state connected to the means transmitting the FSK generator output signal and rendering the means transmitting the FSK generator output signal inoperative in response to the N-bit message code being repeated a predetermined number (M) times, the M-counter output signal being returned to the low state in a predetermined period of time corresponding to the time required to repeat the N-bit message code the predetermined number (M) times.

37. The apparatus of claim 33 defined further to include:

first counter means receiving the shift register clock signal and counting the number of message bits clocked from the N-bit shift register in an activated condition of the first counter means, the first counter means producing an output signal in the high state in response to the predetermined number (N) message bits being clocked from the N-bit shift register;

gate means receiving the transmitter master clock signal and the first counter means output signal, the gate means providing the transmitter master clock signal in the low state of the received first counter means output signal and inhibiting the transmitter master clock signal in the high state of the first counter means output signal; and second counter means receiving the transmitter master clock signal and providing an output signal in the high state in response to a received predetermined number of transmitter

38. A communication apparatus for communicating time division binary codes comprising a predetermined number of message bits, having logic levels representing logical "ones" and logical "zeros," from a transmitter station to a receiver station, the apparatus comprising:

means in the transmitter station having a predetermined message code comprising a predetermined number (N) message bits, generating a message bit complement for each message bit of the (N) bit message code and providing each message bit followed by the message bit complement of the preceding message bit in a serial manner via an output signal;

means in the transmitter station generating a synchronization signal prior to the generation of the (N) message bits and the (N) message bit complements;

means receiving the output signal from the means providing the message bits and the message bit complements, receiving the synchronization signal, transmitting the synchronization signal and then transmitting each of the message bits of the (N) bit message code followed by the message bit complements in a serial manner;

means in the receiver station receiving the transmitted signal and providing an output signal in response to a received synchronization signal;

an N-counter receiving and being activated by the output signal provided in response to the received synchronization signal to count input pulses connected thereto and to provide an output signal in response to a received predetermined number (N) input pulses;

means in the receiver station receiving the transmitted signal and providing an output signal in response to each received message bit followed by the message bit complement, the output signal being connected to the N-counter and providing the input pulses for incrementing the N-counter;

means in the receiver station receiving the transmitted signal and providing a reset signal in response to a received message bit followed by a signal other than the message bit complement, the reset signal being connected to the N-counter and resetting the N-counter; and an M-counter in the receiver station receiving the N-counter output signal and providing a valid data signal in response to a predetermined number (M) received N-counter output signals, the valid data signal indicating the reception of each message bit followed by the message bit complement of each message bit of the (N) bit message code the predetermined number (M) times.

39. A frequency shift key (FSK) method for communicating time division binary message codes comprising a predetermined number (N) of message bits, having logic levels representing locigal "ones" and logical "zeros," from a transmitter station to a receiver station, the method comprising the steps of:

generating an FSK signal having a predetermined frequency;

receiving the FSK signal and producing a transmitter master clock signal having a frequency coherently related to the received FSK signal frequency;

receiving the transmitter master clock signal and producing the message bits of the N-bit message code in a serial manner in response to the received transmitter master clock signal and at a rate coherently related to the received FSK signal frequency;

receiving the message bits produced in response to the transmitter master clock signal and controlling the frequency of the generated FSK signal to provide an FSK signal having a frequency ($f_s$) for each received message bit of a logic level representing a logical "zero" and a frequency ($f_m$) for each received message bit of a logic level representing a logical "one," the FSK signal having a predetermined transmission time for an (N) bit message code independent of the number of logical "ones" and logical "zeros" comprising the (N) bit message code;

transmitting the FSK signal;

receiving the transmitted FSK signal and producing a receiver master clock signal having a frequency coherently related to the received, transmitted FSK signal frequency; and receiving the receiver master clock signal and the transmitted FSK signal and decoding the transmitted FSK signal to derive the message code at a rate determined via the receiver master clock signal coherently related to the FSK signal frequency.

40. A method for transmitting a time division binary message code comprising a predetermined number (N) of message bits, having logic levels representing logical "ones" and logical "zeros," the method comprising the steps of:

transmitting each message bit of the (N) bit message code, including the steps of:

producing each message bit of the N-bit message code in a serial manner;

generating an FSK signal having a frequency ($f_s$) for each produced message bit having a logic level representing a logical "one"; and generating an FSK signal having a frequency ($f_m$) for each produced message bit having a logic level representing a logical "zero"; and transmitting a message bit complement following the transmission of the message bit for each message bit of the (N) bit message code, including the steps of:

producing the message bit complement of each message bit of the N-bit message code, each message bit complement being produced immediately following the produced message bit;

generating an FSK signal having a frequency ($f_s$) for each produced message bit complement having a logic level representing a logical "one"; and generating an FSK signal having a frequency ($f_m$) for each produced message bit complement having a logic level representing a logical "zero", the transmission time for the N-bit message code being $$\left[\left(\frac{1}{f_s}\right)+\left(\frac{1}{f_m}\right)\right]\cdot$$

independent of the number of logical "ones" and logical "zeros" in the N-bit message code.

41. The method of claim 40 defined further to include:

receiving each generated FSK signal and producing a transmitter master clock signal derived from the received FSK signals and having a frequency coherently related to the received FSK signal frequency; and receiving the transmitter master clock signal and producing each message bit and each message bit complement in response to the received transmitter master clock signal at a frequency coherently related to the FSK signals.

42. A method for communicating time division binary codes comprising a predetermined number (N) of message bits from a transmitter station to a receiver station, the method comprising the steps of:

transmitting each message bit of the (N) bit message code;

transmitting a message bit complement following the transmission of the message bit for each message bit of the (N) bit message code;

transmitting a synchronization signal prior to the transmission of the (N) message bits and the (N) message bit complements;

receiving the synchronization signal, the message bits and the message bit complements;

providing a reset signal in response to receiving a message bit followed by a signal other than the message bit complement;

counting the number of message bits followed by the message bit complements received after receiving the synchronization signal and providing an output signal in response to receiving (N) message bits followed by the message bit complements indicating the reception of the N-bit message code;

receiving the reset signal and resetting the counting of the number of message bits followed by the message bit complements in response to receiving the reset signal; and receiving the output signals indicating the reception of the N-bit message code and providing a valid data signal in response to receiving a predetermined number of output signals indicating the reception of the N-bit message code the predetermined number of times.

43. The method of claim 42 wherein the step of transmitting the synchronization signal is defined further to include:

producing a synchronization signal having a logic level corresponding to the logic level of the first message bit of the N-bit message code and a time duration corresponding to the duration of two first message bits.

* * * * *

PO-1050
(5/69)

UNITED STATES PATENT OFFICE
CERTIFICATE OF CORRECTION

Patent No. 3,924,065 Dated December 2, 1975

Inventor(s) Charles C. Freeny, Jr.

It is certified that error appears in the above-identified patent and that said Letters Patent are hereby corrected as shown below:

Column 7, line 8 , "NOr NOR" should be --NOR gate--.

Column 7, line 34, "pulsed" should be --pulses--.

Column 7, line 64, "pulsed" should be --pulses--.

Column 16, line 29, "represencts" should be --represents--.

Column 16, line 63, "cohereent" should be --coherent--.

Column 22, line 52, "stataion" should be --station--.

Column 27, line 32, "anothe" should be --another--.

Column 28, line 51, "transmimtted" should be --transmitted--

Column 43, line 4, "locigal" should be --logical--.

Signed and Sealed this

*thirteenth* Day of *April 1976*

[SEAL]

*Attest:*

RUTH C. MASON
*Attesting Officer*

C. MARSHALL DANN
*Commissioner of Patents and Trademarks*